(12) United States Patent
Sakai et al.

(10) Patent No.: US 8,601,563 B2
(45) Date of Patent: Dec. 3, 2013

(54) WIRELESS TAG, READER/WRITER, ENCODING SYSTEM, AND ENCODING METHOD

(75) Inventors: Atsushi Sakai, Kawasaki (JP); Koken Yamamoto, Inagi (JP); Masahiko Takenaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1323 days.

(21) Appl. No.: 11/354,164

(22) Filed: Feb. 15, 2006

(65) Prior Publication Data

US 2007/0016942 A1  Jan. 18, 2007

(30) Foreign Application Priority Data

Jul. 13, 2005 (JP) ................................. 2005-204775

(51) Int. Cl.
*H04L 29/06* (2006.01)
(52) U.S. Cl.
USPC ........... 726/9; 713/168; 340/10.4; 340/10.33; 340/10.34; 340/10.41
(58) Field of Classification Search
USPC ........ 713/168, 194, 176, 189; 726/9, 21, 1, 4, 726/34; 380/258, 270, 28; 340/5.82, 5.25, 340/825.35, 5.8; 711/164; 375/130; 235/380
See application file for complete search history.

(56) References Cited

U.S. PATENT DOCUMENTS

| | | | | |
|---|---|---|---|---|
| 5,602,538 | A * | 2/1997 | Orthmann et al. ........... | 340/10.2 |
| 5,648,765 | A * | 7/1997 | Cresap et al. ................ | 340/10.4 |
| 7,741,956 | B1 * | 6/2010 | Nysen ........................ | 340/10.41 |
| 2003/0074571 | A1 * | 4/2003 | Fujiwara et al. .............. | 713/191 |
| 2004/0157560 | A1 * | 8/2004 | Yamasaki .................... | 455/63.1 |
| 2004/0222878 | A1 | 11/2004 | Juels | |
| 2004/0250037 | A1 * | 12/2004 | Takemura et al. ............ | 711/164 |
| 2004/0257202 | A1 * | 12/2004 | Coughlin et al. ............ | 340/5.82 |
| 2005/0218215 | A1 * | 10/2005 | Lauden ......................... | 235/380 |
| 2006/0034348 | A1 * | 2/2006 | Schaefer et al. ............. | 375/130 |
| 2006/0214766 | A1 * | 9/2006 | Ghabra et al. ............... | 340/5.25 |

FOREIGN PATENT DOCUMENTS

JP  2005-167670  6/2005

OTHER PUBLICATIONS

Klaus Finkenzeller, "RFID Handbook—Fundamentals and Applications in Contactless Smart Cards and Identification," 2nd edition, John Wiley and Sons Ltd., 2003.*
Shingo Kinoshita, "Consideration on RFID privacy", [online], Sep. 16, 2004, Nikkei Business Publications, Inc., [searched on Jul. 7, 2005], Internet Address: <URL:http://itpro.nikkeibp.co.jp/free/NBY/RFID/20040913/1/>.

(Continued)

*Primary Examiner* — Taghi Arani
*Assistant Examiner* — Jason Lee
(74) *Attorney, Agent, or Firm* — Staas & Halsey LLP

(57) ABSTRACT

An encrypted ID takes as its initial value a tag ID that constitutes an original ID of a wireless tag, and is encrypted using an encryption key each time an ID inquiry is received from a reader/writer. Another encrypted ID also takes the tag ID as its initial value, and is encrypted using an encryption key each time an ID inquiry is received. The wireless tag gives confidential variability to the ID by transmitting a combination of the encrypted ID and the another encrypted ID in reply. The reader/writer can obtain the original ID merely by decoding the two encrypted values until they match, and the decoding load does not increase even if the number of wireless tags that are reading targets increases.

17 Claims, 35 Drawing Sheets

(56) References Cited

OTHER PUBLICATIONS

M. Ohkubo et al., "Cryptographic approach to "Privacy-Friendly" Tags", NTT Laboratories, Nippon Telegraph and Telephone Corporation, [Online] [searched on Jul. 7, 2005], Internet Address: <URL:http://lasecwww.epfl.ch/~gavoine/download/Avione0-2005-perdec.pdf>.

Office Action mailed form the Japanese Patent Office on May 10, 2011 in the corresponding Japanese patent application No. 2005-204775.

* cited by examiner

WIRELESS TAG, READER/WRITER, ENCODING SYSTEM, AND ENCODING METHOD

BACKGROUND OF THE INVENTION

1. Field of the Invention

The present invention relates to a wireless tag, a reader/writer, an encoding system for an ID transmitted by the wireless tag, and an encoding method, and particularly relates to a wireless tag, a reader/writer, an encoding system, and an encoding method, which give confidential variability to an ID transmitted by the wireless tag while enabling a circuit of the wireless tag to be downsized and reducing the load of a decoding process.

2. Description of the Related Art

Recently, IC cards including wireless tags and devices such as mobile terminal devices are widely used. A wireless tag is a small device that includes an antenna for wireless communication and an IC that stores a unique ID, and is also known as a radio frequency identification (RFID). The unique ID stored in the wireless tag is read by a device known as a reader/writer via a wireless communication, and used in various types of processes.

While wireless tags have a wide range of applications and are remarkably useful, they are problematic with regard to privacy protection. IDs are currently exchanged as fixed values between the wireless tag and the reader/writer. Consequently, when identical wireless tags are used in a plurality of locations, a person who somehow manages to obtain a usage history of the wireless ID can track the movements of its owners.

Non-Patent Literatures 1 and 2 disclose examples of techniques that attempt to solve this problem by encoding the ID to a different value each time it is exchanged between the wireless tag and the reader/writer, thereby giving the ID confidential variability.

Hash chain methods disclosed in the Non-Patent Literatures 1 and 2 give confidential variability to an ID by using a random one-way hash function to re-encrypt it.

[Non-Patent Literature 1]: Shingo KINOSHITA, "Consideration on RFID privacy", [online], Sep. 16, 2004, Nikkei Business Publications, Inc., [Searched on Jul. 7, 2005], Internet <URL:http://itpro.nikkeibp.co.jp/free/NBY/RFID/20040913/1/>

[Non-Patent Literature 2]: M. Ohkubo, K. Suzuki, and S. Kinoshita, Cryptographic approach to "privacy-friendly" tags. In RFID Privacy Workshop, MIT, USA, 2003. [Searched on Jul. 7, 2005], Internet <URL:http://lasecwww.epfl.ch/~gavoine/download/Avoine0-2005-persec.pdf>

However, hash chain methods are problematic in that the circuit becomes too large for current technological levels. Given current technological levels, the circuit size allocated for security function of a wireless tag is at best 200 to 2000 gates, yet more than several tens of thousands of gates are needed to realize a hash function of sufficient capability. A circuit of this size is too large for a wireless tag, where downsizing and low cost are demanded.

Hash chain methods also have a problem of load during the ID decoding process. A one-way hash function cannot make a back calculation from an encoded ID to an original ID. To determine the original ID, all candidates for the original ID must be stored and repeatedly encoded with a hash function until the ID that is the decoding target appears. When the number of wireless tags whose IDs need decoding increases, the load of the decoding process becomes enormous.

SUMMARY OF THE INVENTION

It is an object of the present invention to at least solve the problems in the conventional technology.

According to an aspect of the present invention, a wireless tag that includes a unique ID includes a first encoded data generator that generates first encoded data of different values based on the unique ID each time an ID inquiry is received; a second encoded data generator that generates second encoded data for decoding the first encoded data; and a communication unit that replies to an ID inquiry by transmitting a combination of the first encoded data and the second encoded data.

According to another aspect of the present invention, an encoding system that authenticates a unique ID of a wireless tag that is sent from a reader/writer includes a first decoding unit that decodes first encoded data included in a reply to an ID inquiry for a wireless tag that is sent from the reader/writer to obtain first decoded data; a second decoding unit that decodes second encoded data included in the reply to obtain second decoded data; and an identifying unit that identifies the unique ID based on the first decoded data and the second decoded data.

According to still another aspect of the present invention, a reader/writer that authenticates a unique ID of a wireless tag includes a first decoding unit that decodes first encoded data that is included in a reply to an ID inquiry to a wireless tag to obtain first decoded data; a second decoding unit that decodes second encoded data included in the reply to obtain second decoded data; and an identifying unit that identifies the unique ID based on the first decoded data and the second decoded data.

According to still another aspect of the present invention, an encoding method used when a wireless tag transmits a unique ID included in the wireless tag includes generating first encoded data of different values based on the unique ID each time an ID inquiry is received; generating second encoded data for decoding the first encoded data; and replying to an ID inquiry by transmitting a combination of the first encoded data and the second encoded data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
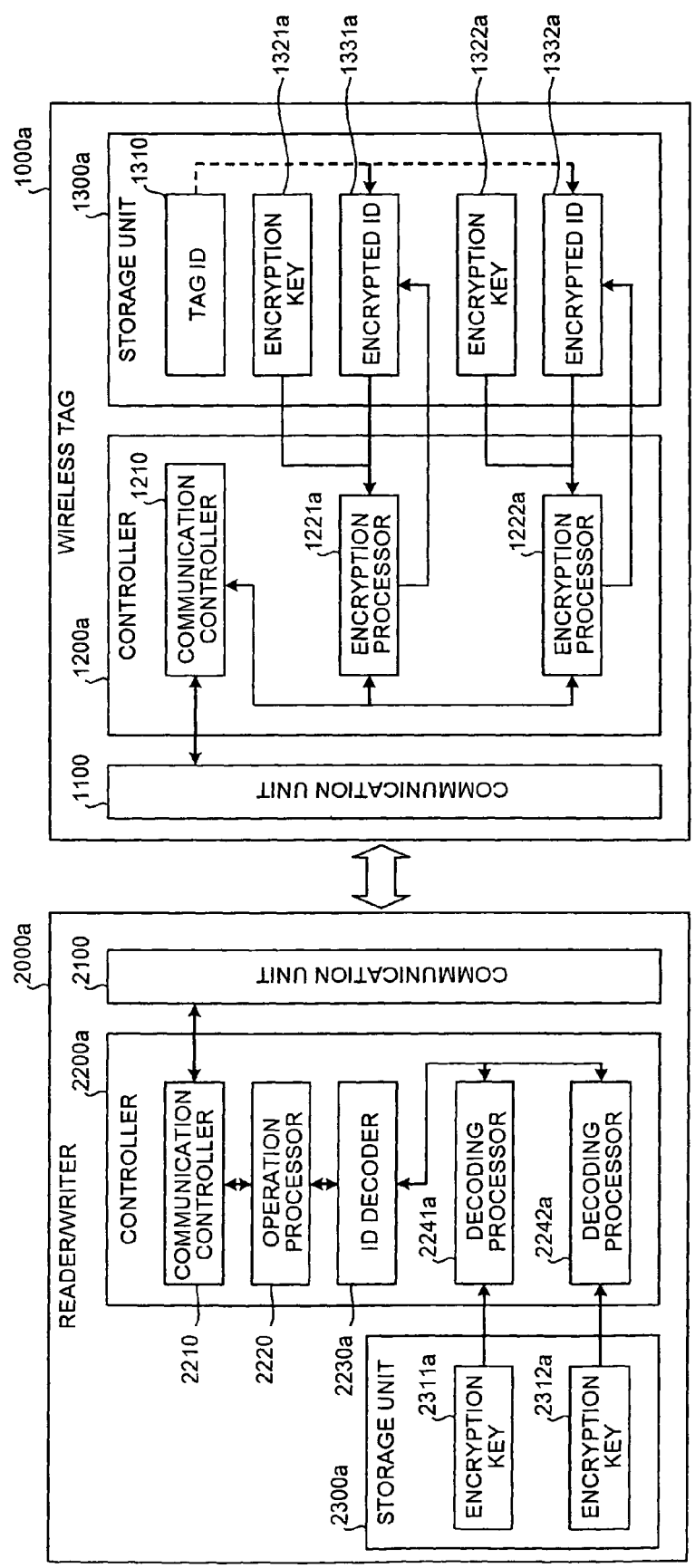
FIG. 1 is a functional block diagram of the configurations of a wireless tag and a reader/writer according to a first embodiment of the present invention.

Exemplary embodiments of a wireless tag, a reader/writer, an encoding system, and an encoding method according to the present invention will be explained below in detail with reference to the accompanying drawings. Like parts are designated with like reference numerals in the embodiments and redundant explanations will be omitted.

The configurations of a wireless tag and a reader/writer according to a first embodiment of the present invention will be explained. FIG. 1 is a functional block diagram of the configurations of the wireless tag and the reader/writer according to the first embodiment.

A wireless tag $1000a$ is a device that exchanges IDs and the like with reader/writers such as a reader/writer $2000a$ via wireless communications, and includes a communication unit $1100$, a controller $1200a$, and a storage unit $1300a$. The communication unit $1100$ is a device that realizes wireless communications with reader/writers such as the reader/writer $2000a$.

The controller $1200a$ controls operations of the wireless tag $1000a$, and includes a communication controller $1210$, an encryption processor $1221a$, and an encryption processor $1222a$. The communication controller $1210$ controls various processes required in exchanging information with reader/writers such as the reader/writer $2000a$ via wireless communications.

For example, when the reader/writer $2000a$ requests transmission of an ID, the communication controller $1210$ requests the encryption processor $1221a$ and the encryption processor $1222a$ to encrypt the ID, connects the encrypted ID, and transmits it in reply to the reader/writer $2000a$ via the communication unit $1100$.

The encryption processor $1221a$ encrypts IDs. Specifically, it uses an encryption key $1321a$ to encrypt an encrypted ID $1331a$ stored in the storage unit $1300a$, sends the encrypted result to the request source, and overwrites it in the encrypted ID $1331a$.

Since the encryption logic of the encryption processor $1221a$ only needs to be decodable, any type of logic can be used. Generally, encryption logic can be installed with a smaller circuit than hash logic and is suitable for devices of limited circuit size, such as wireless tags.

The encryption processor $1222a$ also encrypts IDs, and includes the same encryption logic as the encryption processor $1221a$. Specifically, it uses an encryption key $1322a$ to encrypt an encrypted ID $1332a$ stored in the storage unit $1300a$, sends the encrypted result to the request source, and overwrites it in the encrypted ID $1332a$.

The storage unit $1300a$ stores various types of information, and includes a rewritable nonvolatile memory or a combination of a rewritable nonvolatile memory and a non-rewritable memory. The storage unit $1300a$ stores a tag ID $1310$, the encryption key $1321a$, the encryption key $1322a$, the encrypted ID $1331a$, and the encrypted ID $1332a$.

The tag ID 1310 is the original ID of the wireless tag. The encryption keys 1321a and 1322a are used for encrypting by the encryption processors 1221a and 1222a respectively, and have different values.

The encrypted IDs 1331a and 1332a are encrypted IDs. With the tag ID 1310 as their initial values, their values are overwritten by the encryption processors 1221a and 1222a respectively each time a reader/writer makes an ID inquiry.

Unless otherwise specified in the present specification, the wireless tag can be a single independent device or incorporated in another device such as an information processing apparatus.

The reader/writer 2000a performs predetermined processes by receiving information such as IDs from wireless tags such as the wireless tag 1000a via wireless communication, transmitting information to wireless tags such as the wireless tag 1000a and writing it when required. The reader/writer 2000a includes a communication unit 2100, a controller 2200a, and a storage unit 2300a. The communication unit 2100 realizes wireless communications with wireless tags such as the wireless tag 1000a.

The controller 2200a controls operations of the reader/writer 2000a, and includes a communication controller 2210, an operation processor 2220, an ID decoder 2230a, a decoding processor 2241a, and a decoding processor 2242a.

The communication controller 2210 controls the exchange of information via wireless communication with wireless tags such as the wireless tag 1000a. The operation processor 2220 realizes various operation functions of the reader/writer 2000a.

The ID decoder 2230a is a processor that restores an encrypted ID and determines the original ID. Specifically, it repeatedly decodes two code numbers transmitted from a wireless tag such as the wireless tag 1000a in the decoding processor 2241a and the decoding processor 2242a, and, when two decoded results match, deems this value to be the original ID.

The decoding processor 2241a uses an encryption key 2311a to decode an ID encrypted by the encryption processor 1221a. The encryption logic of the decoding processor 2241a corresponds to the encryption logic of the encryption processor 1221a.

The decoding processor 2242a uses an encryption key 2312a to decode an ID encrypted by the encryption processor 1222a. The encryption logic of the decoding processor 2242a corresponds to the encryption logic of the encryption processor 1222a.

The storage unit 2300a stores various types of information, and includes the encryption key 2311a and an encryption key 2312a. The encryption key 2311a is used for decoding by the decoding processor 2241a, and has the same value as the encryption key 1321a. The encryption key 2312a is used for decoding by the decoding processor 2242a, and has the same value as the encryption key 1322a.

Unless otherwise specified in the present specification, the reader/writer can be a single independent device or incorporated in another device such as an information processor. It does not need to include a function for writing to the wireless tag.

Figure 2:
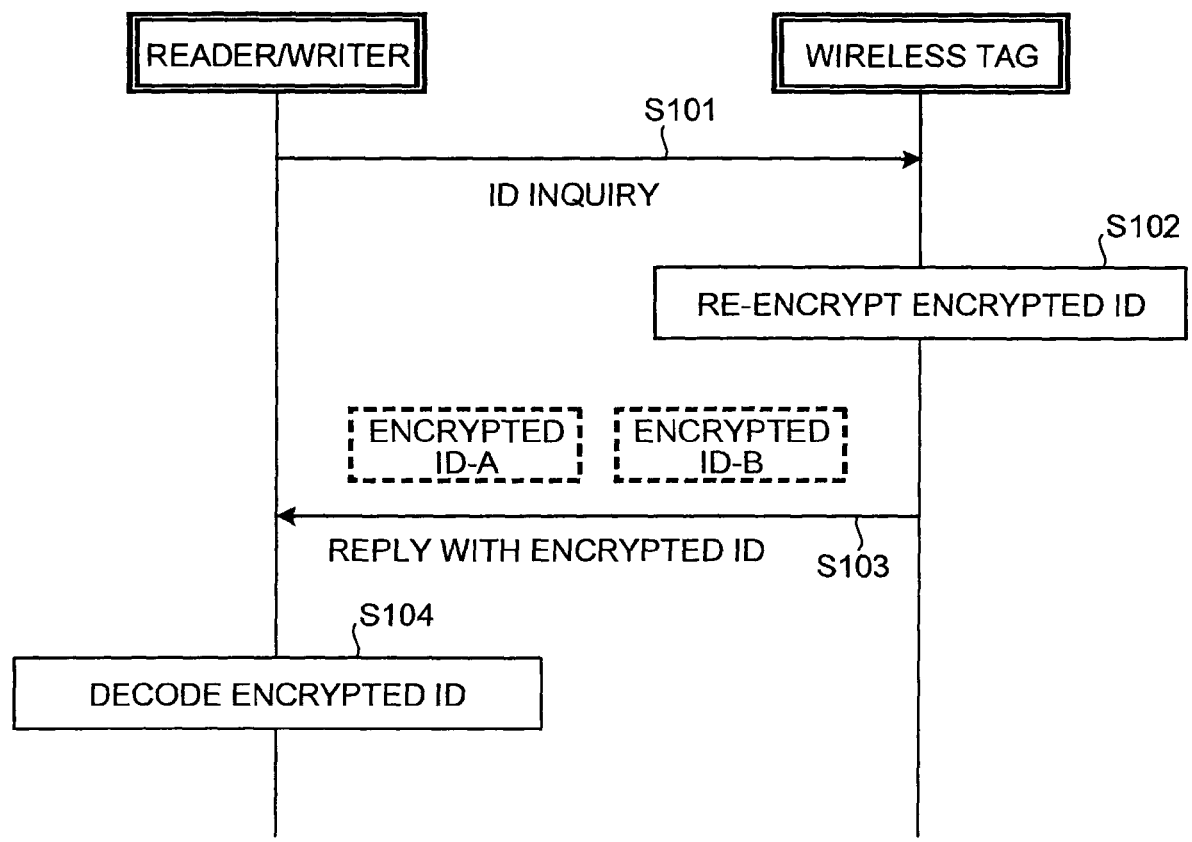
FIG. 2 is a sequence diagram of an exchange between the wireless tag and the reader/writer shown in FIG. 1.

A procedure for exchanging information between the wireless tag 1000a and the reader/writer 2000a will be explained next. FIG. 2 is a sequence diagram of an exchange between the wireless tag 1000a and the reader/writer 2000a shown in FIG. 1. In the procedure of FIG. 2, the reader/writer 2000a transmits an ID inquiry to the wireless tag 1000a, and identifies the ID.

When the reader/writer 2000a transmits an ID inquiry to the wireless tag 1000a (step S101), the wireless tag 1000a re-encrypts the encrypted IDs 1331a and 1332a, rewrites them, and stores them (step S102). The wireless tag 1000a transmits these values as encrypted ID-A and encrypted ID-B in a reply to the reader/writer 2000a (step S103).

The reader/writer 2000a obtains an original ID by performing a predetermined procedure (e.g., decoding) to the encrypted ID-A and the encrypted ID-B, and uses it in various processes (step S104).

Thus in the ID encryption method of the first embodiment, an exchange is completed in a two-way procedure including an inquiry and a reply. Since the communication speed between a wireless tag and a reader/writer is generally approximately several 10 kilobits per second (kbps), the ID encryption method of the first embodiment is advantageous in increasing the number of tag authentications per unit of time.

Figure 3:
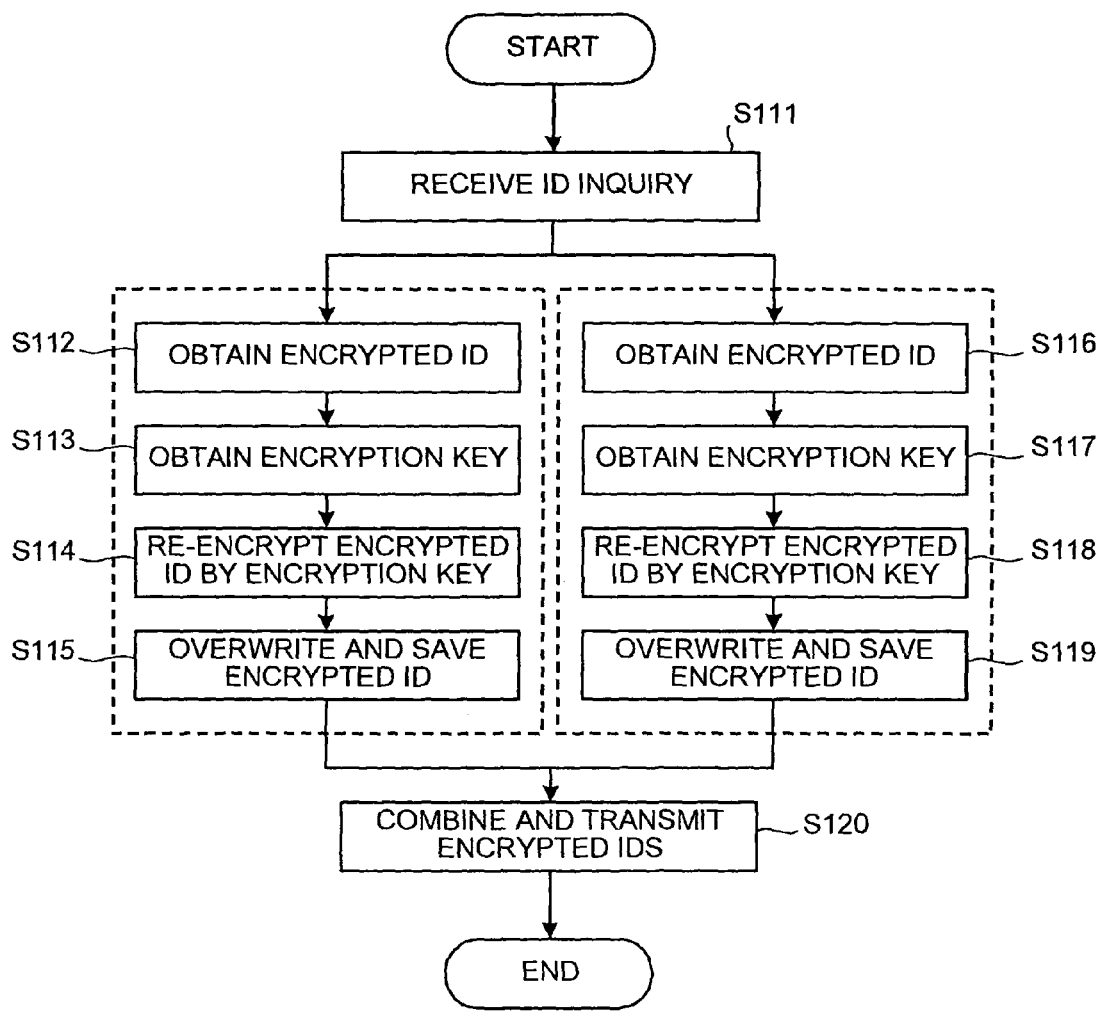
FIG. 3 is a flowchart of a processing procedure performed by the wireless tag shown in FIG. 1.

Processing procedures performed by the wireless tag 1000a and the reader/writer 2000a will be explained next. FIG. 3 is a flowchart of a processing procedure performed by the wireless tag 1000a shown in FIG. 1. In the procedure of FIG. 3, the wireless tag 1000a receives an ID inquiry and replies thereto.

When the wireless tag 1000a receives an ID inquiry (step S111), the encryption processor 1221a obtains the encrypted ID 1331a (step S112) and then obtains the encryption key 1321a (step S113). The encryption key 1321a is used to re-encrypt the encrypted ID 1331a (step S114), and the re-encrypted value is saved by overwriting the encrypted ID 1331a (step S115).

In parallel with the steps S112 to S115, the encryption processor 1222a obtains the encrypted ID 1332a (step S116) and then obtains the encryption key 1322a (step S117). The encryption key 1322a is used to re-encrypt the encrypted ID 1332a (step S118), and the re-encrypted value is overwritten in the encrypted ID 1332a and saved (step S119).

When the ID re-encryption performed by the encryption processor 1221a and the encryption processor 1222a is completed, the wireless tag 1000a combines the two re-encrypted results and transmits them to the request source via the communication unit 1100 (step S120).

Figure 4:
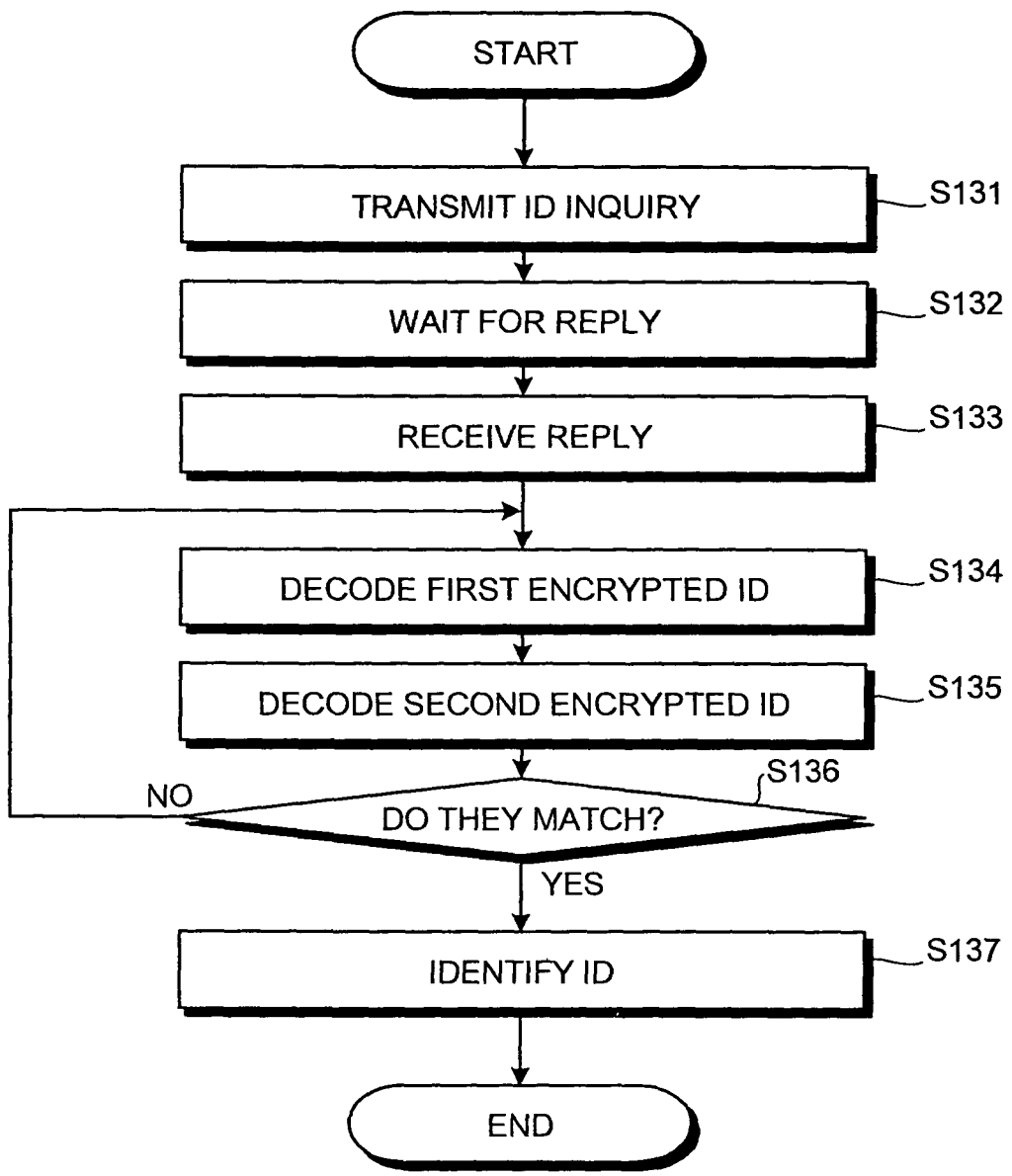
FIG. 4 is a flowchart of a processing procedure performed by the reader/writer shown in FIG. 1.

FIG. 4 is a flowchart of a processing procedure performed by the reader/writer 2000a shown in FIG. 1. In the procedure of FIG. 4, the reader/writer 2000a transmits an ID inquiry to the wireless tag 1000a and identifies the original ID.

The reader/writer 2000a transmits an ID inquiry to the wireless tag 1000a (step S131) and waits for a reply (step S132). When it receives a reply (step S133), it obtains a first encrypted ID (encrypted ID-A) and a second encrypted ID (encrypted ID-B) from the reply data.

The decoding processor 2241a decodes the first encrypted ID (step S134) and the decoding processor 2242a decodes the second encrypted ID (step S135). The two decoded results are compared, and if they do not match (step S136: No), the procedure returns to the step S134 where the decoded results are decoded again.

If the two decoded results match (step S136: Yes), which value is deemed to be the original ID and the identification process ends (step S137).

In the first embodiment, in reply to the ID inquiry, two encrypted values that are re-encrypted by the wireless tag 1000a using different encryption keys are transmitted as a reply. This gives confidential variability to the ID transmitted from the wireless tag 1000a.

In the first embodiment, since an encryption process is used in encoding the ID, the circuit can be made smaller than when encoding by a hash process.

In the first embodiment, the reader/writer 2000a repeatedly decodes two encrypted values and identifies the original ID by comparing the decoded results, thereby enabling the ID to be identified using only information that is transmitted from the wireless tag 1000a. Therefore, even if the number of wireless tags whose IDs require decoding increases, the load of the decoding process does not increase.

While in the first embodiment, the wireless tag 1000a re-encrypts the ID after receiving an ID inquiry and transmits the result as a reply, in an alternative configuration, after receiving an ID inquiry, the wireless tag 1000a can first reply by sending a value that is previously re-encrypted, and then re-encrypt the ID. This reduces the reply time.

If the original ID is set to the encrypted IDs 1331a and 1332a when the wireless tag 1000a is delivered or the like, the wireless tag 1000a does not need to include the tag ID 1310. This prevents the original ID from being directly discovered by disassembling and physically examining the wireless tag 1000a.

The encryption processors 1221a and 1222a can be configured as a single processor instead of as independent processors. In this case, although the encryption process becomes sequential instead of parallel, the circuit size can be reduced.

When the encryption processors 1221a and 1222a are configured independently, their encryption logics can be different.

While in the first embodiment, the load of the decoding process does not increase when the number of wireless tags requiring ID decoding increases, the amount of calculation for decoding also increases as the number of ID inquiries to the wireless tag increases. A second embodiment of the present invention provides a method that can reduce the amount of calculation for decoding the ID.

Figure 5:
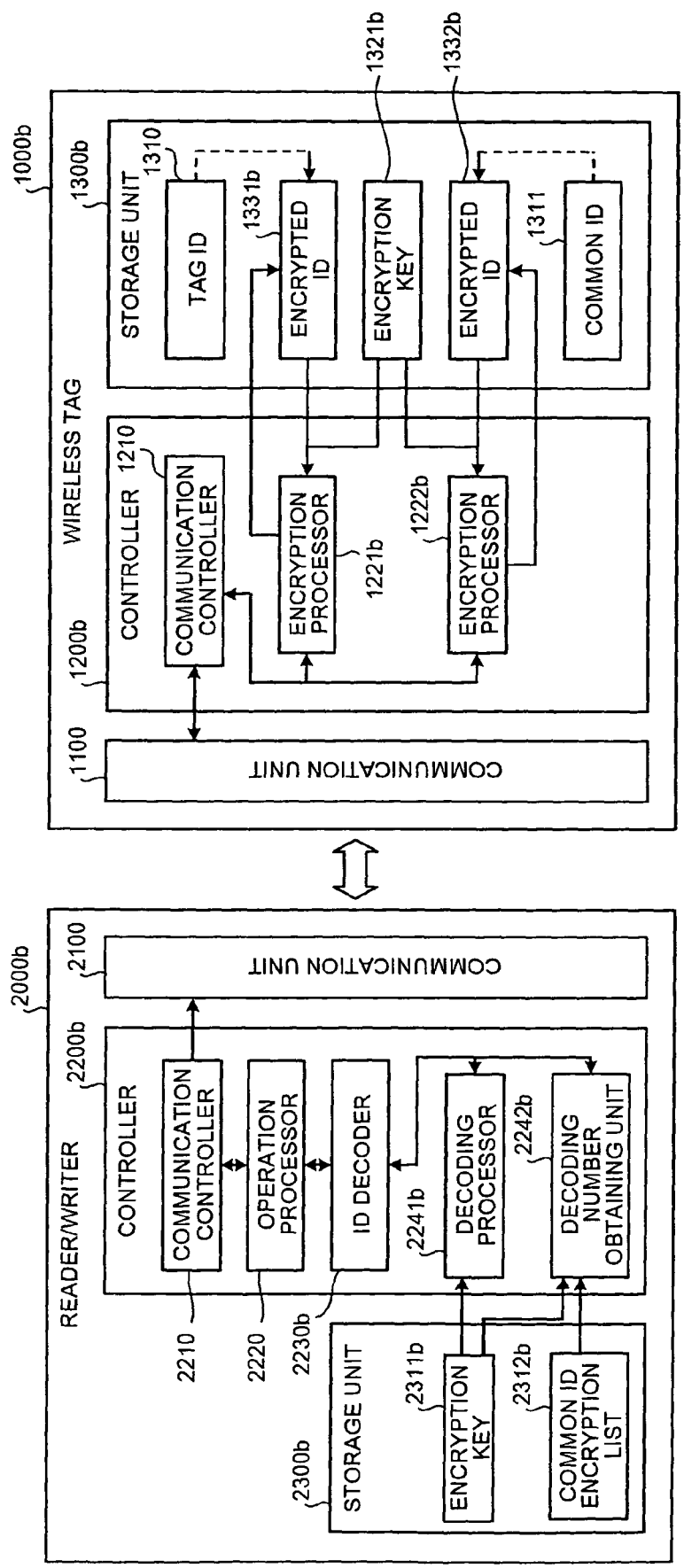
FIG. 5 is a functional block diagram of the configurations of a wireless tag and a reader/writer according to a second embodiment of the present invention.

A wireless tag and a reader/writer according to the second embodiment will be explained first. FIG. 5 is a functional block diagram of the configurations of the wireless tag and the reader/writer according to the second embodiment.

A wireless tag 1000b is a device that exchanges IDs and the like with reader/writers such as a reader/writer 2000b via wireless communication, and includes the communication unit 1100, a controller 1220b, and a storage unit 1300b.

The controller 1220b controls operations of the wireless tag 1000b, and includes the communication controller 1210, an encryption processor 1221b, and an encryption processor 1222b.

The encryption processors 1221b and 1222b are similar to the encryption processors 1221a and 1222a respectively, a difference is that they use a common encryption key 1321b for encrypting.

The storage unit 1300b stores various types of information, and includes a rewritable nonvolatile memory or a combination of a rewritable nonvolatile memory and a non-rewritable memory. The storage unit 1300b stores the tag ID 1310, a common ID 1311, the encryption key 1321b, an encrypted ID 1331b, and an encrypted ID 1332b.

The common ID 1311 is used communally by wireless tags of the same type. The encryption key 1321b is used in encryption processes by the encryption processors 1221b and 1222b.

The encrypted IDs 1331b and 1332b are encrypted IDs. With the tag ID 1310 and the common ID 1311 as their respective initial values, their values are overwritten by the encryption processors 1221b and 1222b respectively each time a reader/writer makes an ID inquiry.

The reader/writer 2000b performs predetermined processes by receiving information such as IDs from wireless tags such as the wireless tag 1000b via wireless communication, transmitting information to wireless tags such as the wireless tag 1000b and writing it when required. The reader/writer 2000b includes the communication unit 2100, a controller 2200b, and a storage unit 2300b.

The controller 2200b controls operations of the reader/writer 2000b, and includes the communication controller 2210, the operation processor 2220, an ID decoder 2230b, a decoding processor 2241b, and a decoding number obtaining unit 2242b.

The ID decoder 2230b is a processor that restores an encrypted ID and determines the original ID. Specifically, of two encryption values transmitted from a wireless tag such as the wireless tag 1000b, the ID decoder 2230b sends an encryption value that is based on the common ID 1311 to the decoding number obtaining unit 2242b to obtain the number of encryptions of that ID, and makes the decoding processor 2241b decode the other encryption value the same number of times, the decoded result being deemed as the original ID.

The decoding processor 2241b uses the encryption key 2311b to decode an ID encrypted by the encryption processor 1221b. The encryption logic of the decoding processor 2241b corresponds to the encryption logic of the encryption processor 1221b.

The decoding number obtaining unit 2242b is a processor that obtains the number of encryptions by collating encrypted values with the common ID 1311 as an initial value and a common ID encryption list 2312b.

The common ID encryption list 2312b stores the values resulting from re-encryption using the common ID 1311 as an initial value together with the number of encryptions, enabling the number of encryptions to be obtained without performing a calculation. If the common ID encryption list 2312b does not include the encrypted value, the decoding number obtaining unit 2242b encrypts the last re-encrypted result that is stored, compares the result, and adds it to the common ID encryption list 2312b.

The storage unit 2300b stores various types of information, and includes the encryption key 2311b and the common ID encryption list 2312b. The encryption key 2311b is used for decoding by the decoding processor 2241b, and has the same value as the encryption key 1321b. The common ID encryption list 2312b has already been explained, and will not be explained further.

Processing procedures performed by the wireless tag 1000b and the reader/writer 2000b will be explained next. The processing procedure performed by the wireless tag 1000b uses a common encryption key, and is otherwise the same as the processing procedure performed by the wireless tag 1000a.

Figure 6:
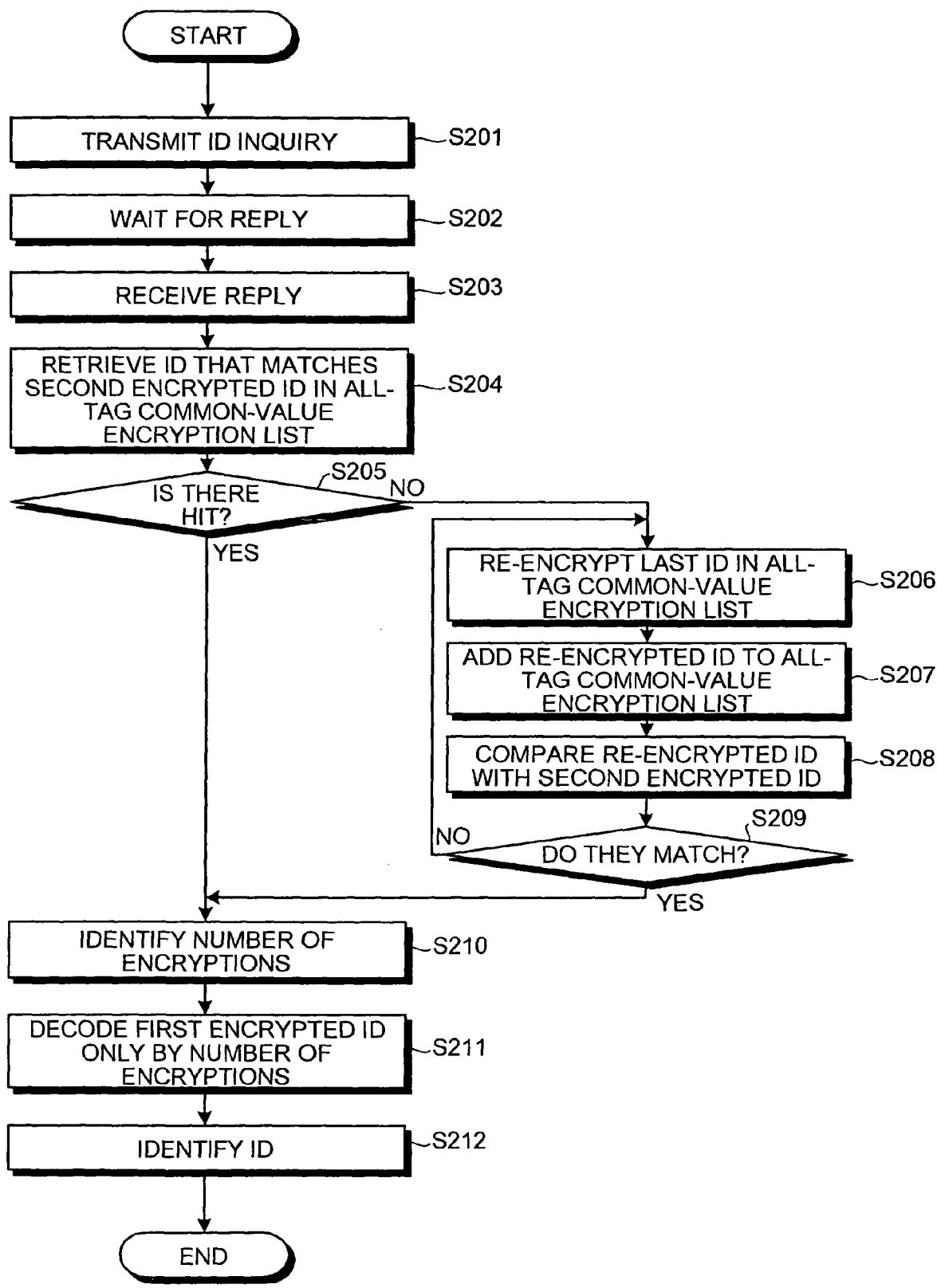
FIG. 6 is a flowchart of a processing procedure performed by the reader/writer shown in FIG. 5.

FIG. 6 is a flowchart of a processing procedure performed by the reader/writer 2000b shown in FIG. 5. The reader/writer 2000b transmits an ID inquiry to the wireless tag 1000b and identifies the original ID.

The reader/writer 2000b transmits an ID inquiry to the wireless tag 1000b (step S201) and waits for a reply (step S202). When it receives a reply (step S203), it obtains a first encrypted ID (an encrypted value with the tag ID 1310 as its initial value) and a second encrypted ID (an encrypted value with the common ID 1311 as its initial value) from the reply data.

From the common ID encryption list 2312b, the reader/writer 2000b retrieves a value that matches the second encrypted ID, and obtains the number of encryptions (step S204).

If there is no matching value in the common ID encryption list 2312b (step S205: No), the reader/writer 2000b re-encrypts the last value (step S206) and adds the encrypted result to the common ID encryption list 2312*b* (step S207). It then compares the encrypted result with the second encrypted ID (step S208), and if they do not match (step S209: No), returns to the step S206 where it calculates the next encrypted result and compares it.

When the number of encryptions is identified (step S210), the decoding processor 2241*b* decodes the first encrypted ID the same number of times (step S211) and deems the value obtained to be the original ID, whereby the identification process ends (step S212).

As in the second embodiment, one of the values in the reply from the wireless tag 1000*b* is an encryption value that takes a common value as its initial value, and a table including the re-encrypted result of this common value is prepared in the reader/writer 2000*b*, enabling the number of encryptions to be obtained by retrieving this value. Therefore, the amount of calculation in the decoding process can be reduced to approximately half that of the first embodiment.

While in the second embodiment, the wireless tag 1000*b* re-encrypts the ID after receiving the ID inquiry and transmits the result in reply, in an alternative configuration, after receiving the ID inquiry, the wireless tag 1000*b* can first reply by sending a value that is previously re-encrypted and then re-encrypt the ID. This reduces the reply time.

If the original ID is set to the encrypted ID 1331*b* when the wireless tag 1000*b* is delivered or the like, the wireless tag 1000*b* does not need to include the tag ID 1310. This prevents the original ID from being directly discovered by disassembling and physically examining the wireless tag 1000*b*.

The encryption processors 1221*b* and 1222*b* can be configured as a single processor instead of as independent processors. In this case, although the encryption process becomes sequential instead of parallel, the circuit size can be reduced.

When the encryption processors 1221*b* and 1222*b* are configured independently, their encryption logics can be different.

While in the second embodiment, one of the values in the reply from the wireless tag is an encryption value that takes a common value as its initial value to reduce the amount of calculation for decoding, the same effect can be achieved when one of the values in the reply from the wireless tag is an encryption value that takes its value from a counter. A third embodiment of the present invention describes a method where one of the values in the reply from the wireless tag is an encryption value that takes its value from a counter.

Figure 7:
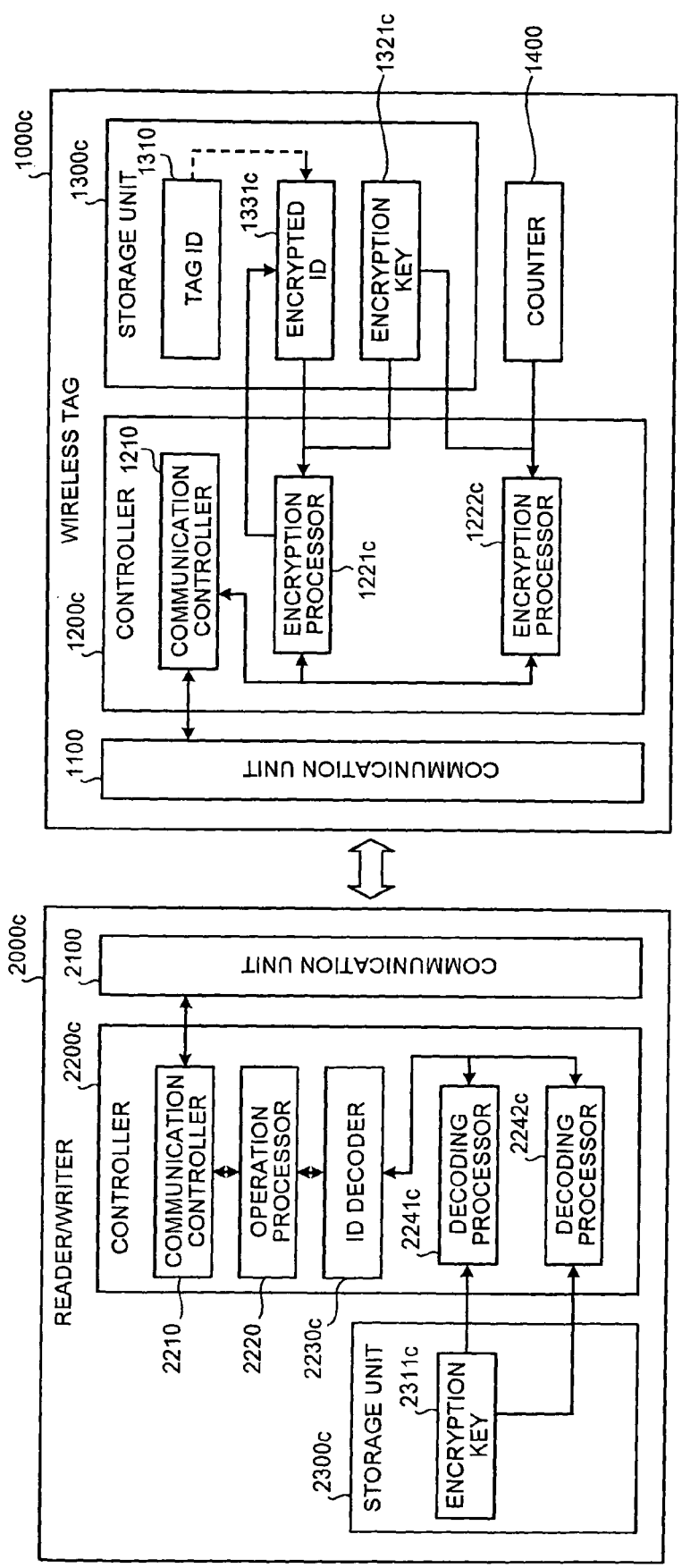
FIG. 7 is a functional block diagram of the configurations of a wireless tag and a reader/writer according to a third embodiment of the present invention.

Firstly, the configurations of a wireless tag and a reader/writer in the third embodiment will be explained. FIG. 7 is a functional block diagram of the configurations of the wireless tag and the reader/writer according to the third embodiment.

A wireless tag 1000*c* is a device that exchanges IDs and the like with reader/writers such as a reader/writer 2000*c* via wireless communication, and includes the communication unit 1100, a controller 1200*c*, a storage unit 1300*c*, and a counter 1400.

The controller 1200*c* controls operations of the wireless tag 1000*c*, and includes the communication controller 1210, an encryption processor 1221*c*, and an encryption processor 1222*c*.

The encryption processor 1221*c* encrypts IDs. Specifically, it uses an encryption key 1321*c* to encrypt an encrypted ID 1331*c* that is stored in the storage unit 1300*c*, sends the encrypted result to the request source, and stores it by overwriting the encrypted ID 1331*c*. Since the encryption logic of the encryption processor 1221*c* only needs to be decodable, any type of logic can be used.

The encryption processor 1222*c* encrypts the counter 1400 by using the encryption key 1321*c*. Since the encryption logic of the encryption processor 1222*c* only needs to be decodable, any type of logic can be used.

The storage unit 1300*c* stores various types of information, and includes a rewritable nonvolatile memory or a combination of a rewritable nonvolatile memory and a non-rewritable memory. The storage unit 1300*c* stores the tag ID 1310, the encryption key 1321*c*, and an encrypted ID 1331*c*.

The encryption key 1321*c* is used in encryption processes performed by the encryption processors 1221*c* and 1222*c*. The encrypted ID 1331*c* is an encrypted ID. With the tag ID 1310 as its initial value, the encrypted ID 1331*c* is overwritten by the encryption processor 1221*c* each time a reader/writer makes an ID inquiry.

The counter 1400 is a circuit that stores a numerical value. The counter 1400 takes 0 as its initial value, and is incremented by 1 each time an ID inquiry is received. Consequently, the counter 1400 stores the number of ID inquiries that are made, i.e., the number of encryptions of the encrypted ID 1331*c*.

The reader/writer 2000*c* performs predetermined processes by receiving information such as IDs from wireless tags such as the wireless tag 1000*c* via wireless communication, transmitting information to wireless tags such as the wireless tag 1000*c* and writing it when required. The reader/writer 2000*c* includes the communication unit 2100, a controller 2200*c*, and a storage unit 2300*c*.

The controller 2200*c* controls operations of the reader/writer 2000*c*, and includes the communication controller 2210, the operation processor 2220, an ID decoder 2230*c*, a decoding processor 2241*c*, and a decoding processor 2242*c*.

The ID decoder 2230*c* is a processor that restores an encrypted ID and determines the original ID. Specifically, of the two encryption values transmitted from a wireless tag such as the wireless tag 1000*c*, the ID decoder 2230*c* sends an encryption value that is encrypted from the value of the counter 1400 to the decoding processor 2242*c* and obtains the value of the counter 1400, i.e., the number of encryptions of the ID. The ID decoder 2230*c* makes the decoding processor 2241*c* decode the other encrypted value the same number of times, and deems the decoded result to be the original ID.

The decoding processor 2241*c* uses the encryption key 2311*c* to decode an ID encrypted by the encryption processor 1221*c*. The encryption logic of the decoding processor 2241*c* corresponds to the encryption logic of the encryption processor 1221*c*.

The decoding processor 2242*c* uses an encryption key 2312*c* to decode an ID encrypted by the encryption processor 1222*c*. The encryption logic of the decoding processor 2242*c* corresponds to the encryption logic of the encryption processor 1222*c*.

The storage unit 2300*c* stores various types of information, and includes the encryption key 2311*c*. The encryption key 2311*c* is used for decoding by the decoding processors 2241*c* and 2242*c*, and has the same value as the encryption key 1321*c*.

Figure 8:
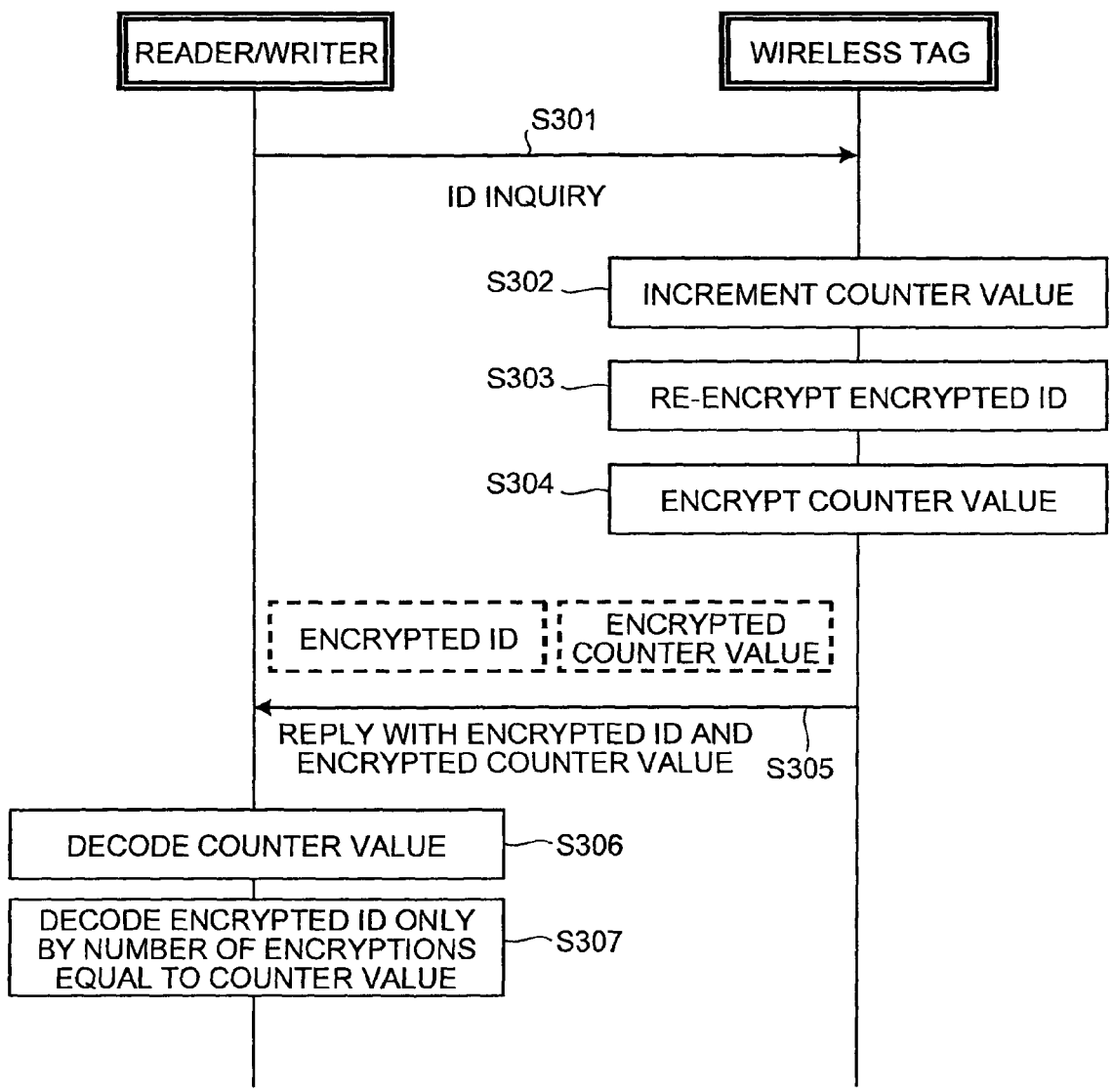
FIG. 8 is a sequence diagram of an exchange between the wireless tag and the reader/writer shown in FIG. 7.

A procedure for exchanging information between the wireless tag 1000*c* and the reader/writer 2000*c* will be explained next. FIG. 8 is a sequence diagram of an exchange between the wireless tag 1000*c* and the reader/writer 2000*c* shown in FIG. 7. In the procedure of FIG. 8, the reader/writer 2000*c* transmits an ID inquiry to the wireless tag 1000*c* and identifies the ID.

When the reader/writer 2000*c* transmits an ID inquiry to the wireless tag 1000*c* (step S301), the wireless tag 1000*c* increments the value of the counter 1400 (step S302). It then re-encrypts the encryption key 1331*c* and stores it by overwriting (step S303), and also encrypts the value of the counter 1400 (step S304). It sends these values in a reply to the reader/writer 2000*c* (step S305).

The reader/writer 2000*c* decodes the counter 1400 (step S306), obtains the original ID by decoding the encrypted ID by the same number of times as that value, and uses it in various processes (step S307).

Figure 9:
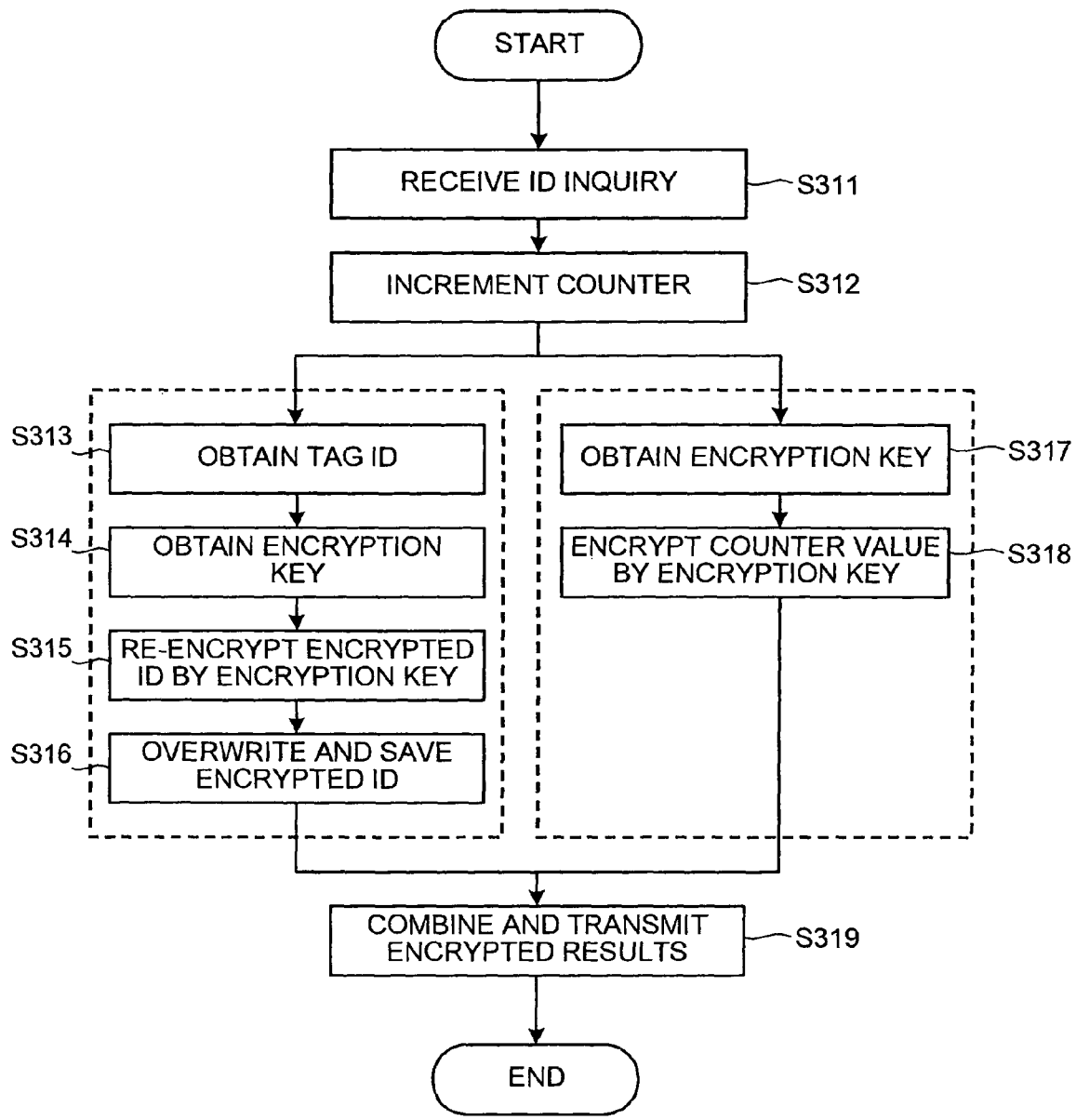
FIG. 9 is a flowchart of a processing procedure performed by the wireless tag shown in FIG. 7.

Processing procedures performed by the wireless tag 1000*c* and the reader/writer 2000*c* will be explained next. FIG. 9 is a flowchart of a processing procedure performed by the wireless tag 1000*c* shown in FIG. 7. In the procedure of FIG. 9, the wireless tag 1000*c* receives an ID inquiry and transmits a reply.

When the wireless tag 1000*c* receives an ID inquiry (step S311), the value of the counter 1400 is incremented (step S312).

The encryption processor 1221*c* obtains the encrypted ID 1331*c* (step S313) and the encryption key 1321*c* (step S314). It uses the encryption key 1321*c* to re-encrypt the encrypted ID 1331*c* (step S315) and saves the re-encrypted value by overwriting the encrypted ID 1331*c* (step S316).

In parallel with the steps S313 to S316, the encryption processor 1222*c* obtains the encryption key 1321*c* (step S317) and uses the encryption key 1321*c* to encrypt the value of the counter 1400 (step S318).

When encryption by the encryption processors 1221*c* and 1222*c* is completed, the wireless tag 1000*c* combines the two encrypted results and transmits them to the request source via the communication unit 1100 (step S319).

Figure 10:
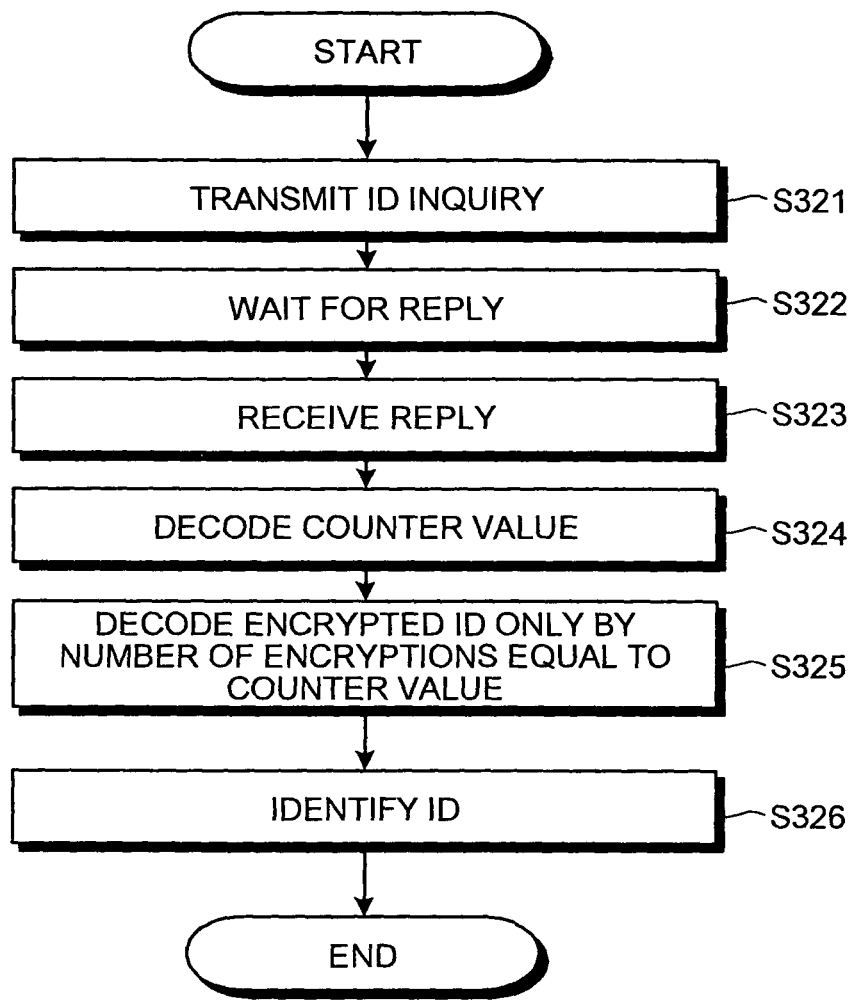
FIG. 10 is a flowchart of a processing procedure performed by the reader/writer shown in FIG. 7.

FIG. 10 is a flowchart of a processing procedure performed by the reader/writer 2000*c* shown in FIG. 7. In the procedure of FIG. 10, the reader/writer 2000*c* transmits an ID inquiry to the wireless tag 1000*c* and identifies the original ID.

The reader/writer 2000*c* transmits an ID inquiry to the wireless tag 1000*c* (step S321) and waits for a reply (step S322). When it receives a reply (step S323), it obtains an encrypted ID and the encrypted counter value from the reply data.

The decoding processor 2242*c* decodes the encrypted counter value (step S324) and the decoding processor 2241*c* decodes the encrypted ID a number of times that is the same as the counter value (step S325). The decoded result is deemed to be the original ID and the identification process ends (step S326).

In the third embodiment, one of the encryption values in the reply from the wireless tag 1000*c* is an encrypted counter value indicating the number of re-encryptions, enabling the reader/writer 2000*c* to obtain the number of re-encryptions by decoding this value. Therefore, the amount of calculation in the decoding process can be reduced to approximately half that of the first embodiment.

If the original ID is set to the encrypted ID 1331*c* when the wireless tag 1000*c* is delivered or the like, the wireless tag 1000*c* does not need to include the tag ID 1310. This configuration prevents the original ID from being directly discovered by disassembling and physically examining the wireless tag 1000*c*.

The encryption processors 1221*c* and 1222*c* can be configured as a single processor instead of as independent processors. In this case, although the encryption process becomes sequential instead of parallel, the circuit size can be reduced.

When the encryption processors 1221*c* and 1222*c* are configured independently, their encryption logics can be different.

While the first to the third embodiments assume that the wireless tag includes a rewritable nonvolatile memory, such a memory can be omitted from the wireless tag and the like to reduce the cost. A fourth embodiment of the present invention describes a method that can achieve confidential variability of an ID in a read-only wireless tag.

Figure 11:
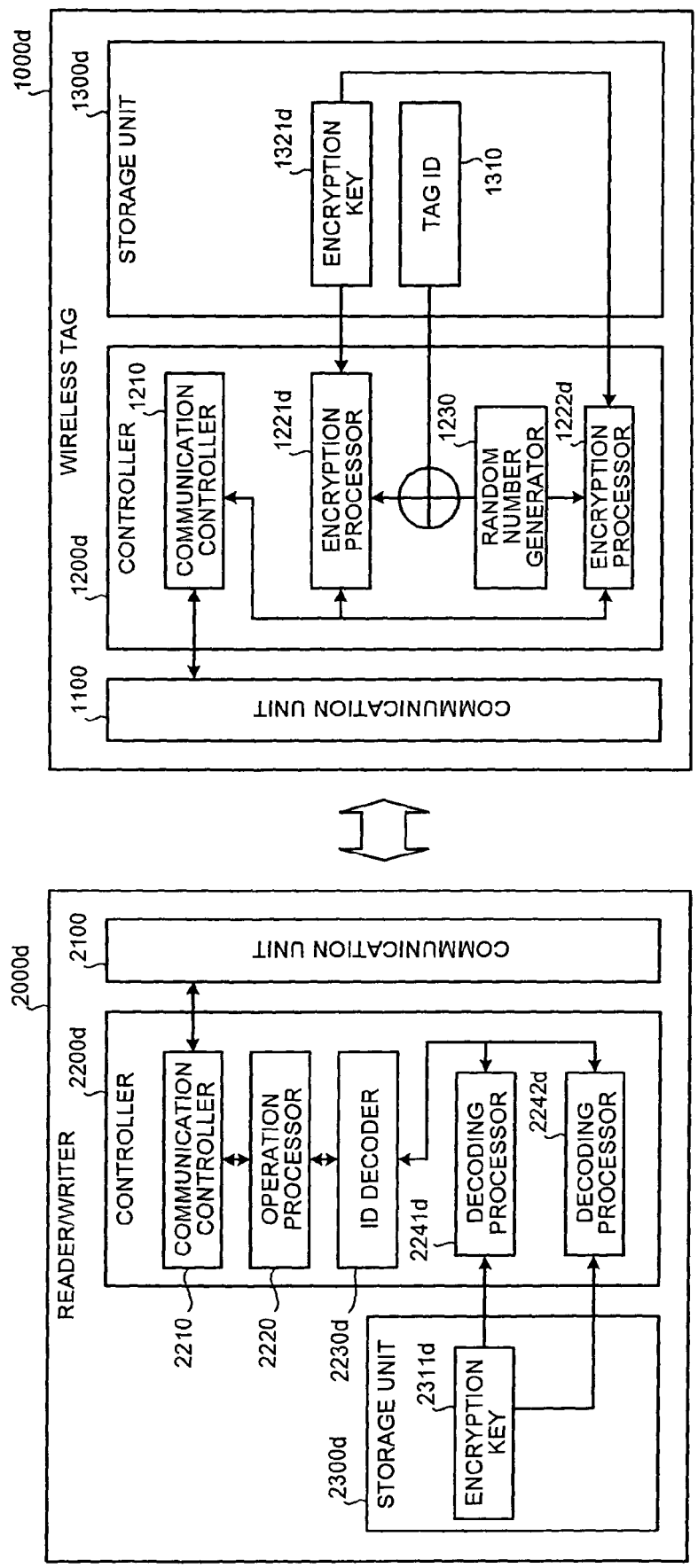
FIG. 11 is a functional block diagram of the configurations of a wireless tag and a reader/writer according to a fourth embodiment of the present invention.

Firstly, the configurations of a wireless tag and a reader/writer according to the fourth embodiment will be explained. FIG. 11 is a functional block diagram of the configurations of the wireless tag and the reader/writer according to the fourth embodiment.

A wireless tag 1000*d* is a device that exchanges IDs and the like with reader/writers such as a reader/writer 2000*d* via wireless communication, and includes the communication unit 1100, a controller 1200*d*, and a storage unit 1300*d*.

The controller 1200*d* controls operations of the wireless tag 1000*d*, and includes the communication controller 1210, an encryption processor 1221*d*, an encryption processor 1222*d*, and a random number generator 1230.

The encryption processor 1221*d* encrypts IDs. Specifically, it performs an exclusive-OR operation on a random number generated by the random number generator 1230 and the tag ID 1310, and encrypts the result of this operation by using the encryption key 1321*d*. Since the encryption logic of the encryption processor 1221*d* only needs to be decodable, any type of logic can be used.

The encryption processor 1222*d* uses the encryption key 1321*d* to encrypt a random number generated by the random number generator 1230. Since the encryption logic of the encryption processor 1222*d* only needs to be decodable, any type of logic can be used.

The random number generator 1230 generates random numbers. The random number generator 1230 generates a new number each time an ID inquiry is received.

The storage unit 1300*d* stores various types of information, and includes a rewritable nonvolatile memory or a combination of a rewritable nonvolatile memory and a non-rewritable memory. The storage unit 1300*d* stores the tag ID 1310 and the encryption key 1321*d*. The encryption key 1321*d* is used in encryption processes by the encryption processors 1221*d* and 1222*d*.

The reader/writer 2000*d* performs predetermined processes by receiving information such as IDs from wireless tags such as the wireless tag 1000*d* via wireless communication, transmitting information to wireless tags such as the wireless tag 1000*d* and writing it when required. The reader/writer 2000*d* includes the communication unit 2100, a controller 2200*d*, and a storage unit 2300.

The controller 2200*d* controls operations of the reader/writer 2000*d*, and includes the communication controller 2210, the operation processor 2220, an ID decoder 2230*d*, a decoding processor 2241*d*, and a decoding processor 2242*d*.

The ID decoder 2230*d* is a processor that restores an encrypted ID and determines the original ID. Specifically, of the two encryption values transmitted from a wireless tag such as the wireless tag 1000*d*, the ID decoder 2230*d* sends an encryption value that is encrypted from a random number to the decoding processor 2242*d* to the random number, and makes the decoding processor 2241*d* decode the other encryption value. The ID decoder 2230*d* then performs an exclusive-OR operation on the decoded result and the random number, and deems the result of this operation to be the original ID.

The decoding processor 2241*d* uses the encryption key 2311*d* to decode the exclusive-OR of the random number encrypted by the encryption processor 1221*d* and the tag ID

1310. The encryption logic of the decoding processor 2241*d* corresponds to the encryption logic of the encryption processor 1221*d*.

The decoding processor 2242*d* uses an encryption key 2311*d* to decode the random number encrypted by the encryption processor 1222*d*. The encryption logic of the decoding processor 2242*d* corresponds to the encryption logic of the encryption processor 1222*d*.

The storage unit 2300*d* stores various types of information, and stores the encryption key 2311*d*. The encryption key 2311*d* is used in decoding by the decoding processors 2241*d* and 2242*d*, and has the same value as the encryption key 1321*d*.

Figure 12:
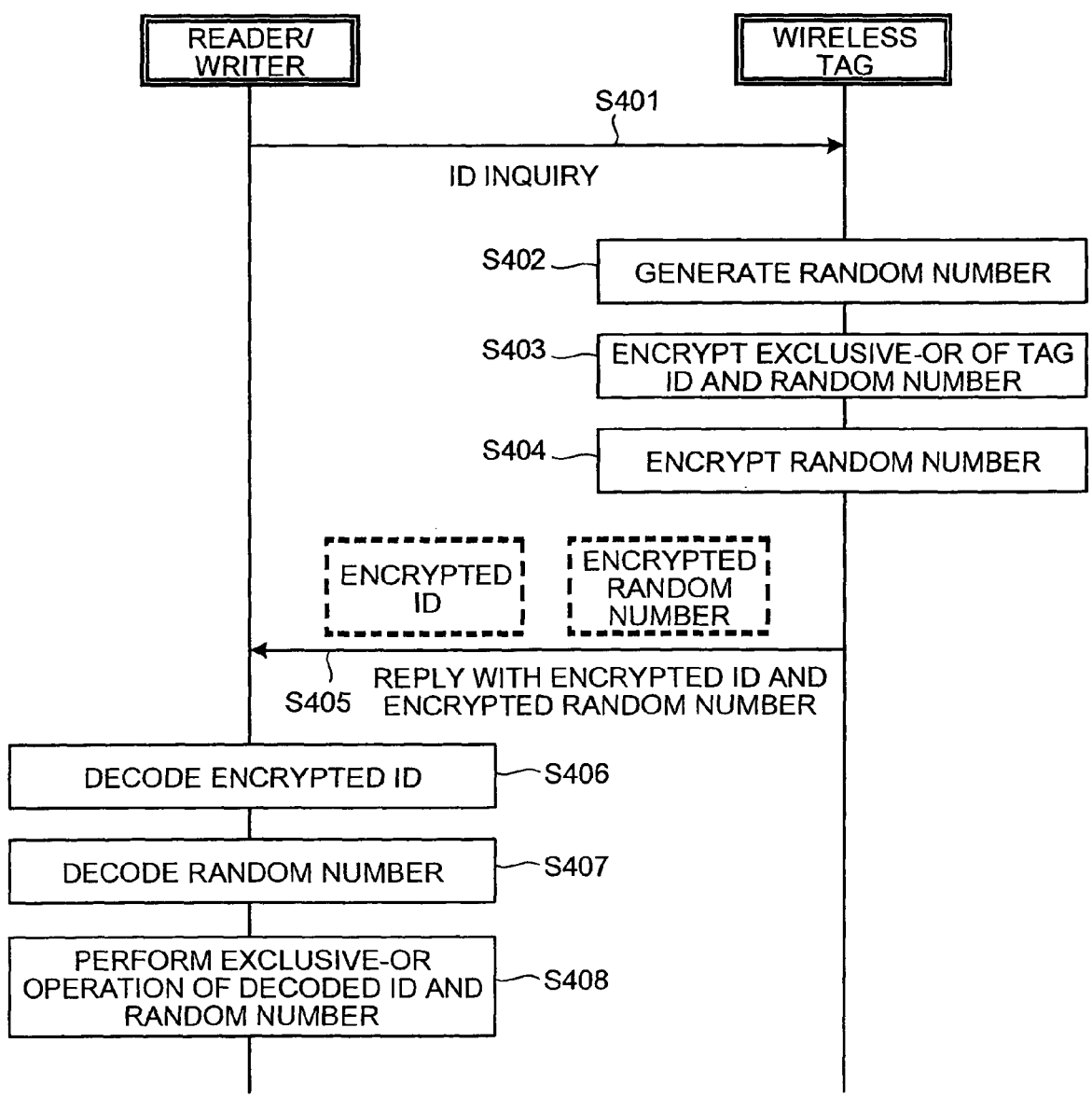
FIG. 12 is a sequence diagram of an exchange between the wireless tag and the reader/writer shown in FIG. 11.

A procedure for exchanging information between the wireless tag 1000*d* and the reader/writer 2000*d* will be explained next. FIG. 12 is a sequence diagram of an exchange between the wireless tag 1000*d* and the reader/writer 2000*d* shown in FIG. 11. In the procedure of FIG. 12, the reader/writer 2000*d* transmits an ID inquiry to the wireless tag 1000*d* and identifies the ID.

When the reader/writer 2000*d* transmits an ID inquiry to the wireless tag 1000*d* (step S401), the wireless tag 1000*d* uses the random number generator 1230 to generate a random number (step S402). It then performs an exclusive-OR operation on the random number and the ID 1310, and encrypts the result (step S403). It also encrypts the random number (step S404). It sends these values in a reply to the reader/writer 2000*d* (step S405).

The reader/writer 2000*d* decodes the encrypted ID (step S406), and decodes the random number (step S407). It then obtains the original ID by performing an exclusive-OR operation on the decoded ID and the random number, and uses it in various processes (step S408).

Figure 13:
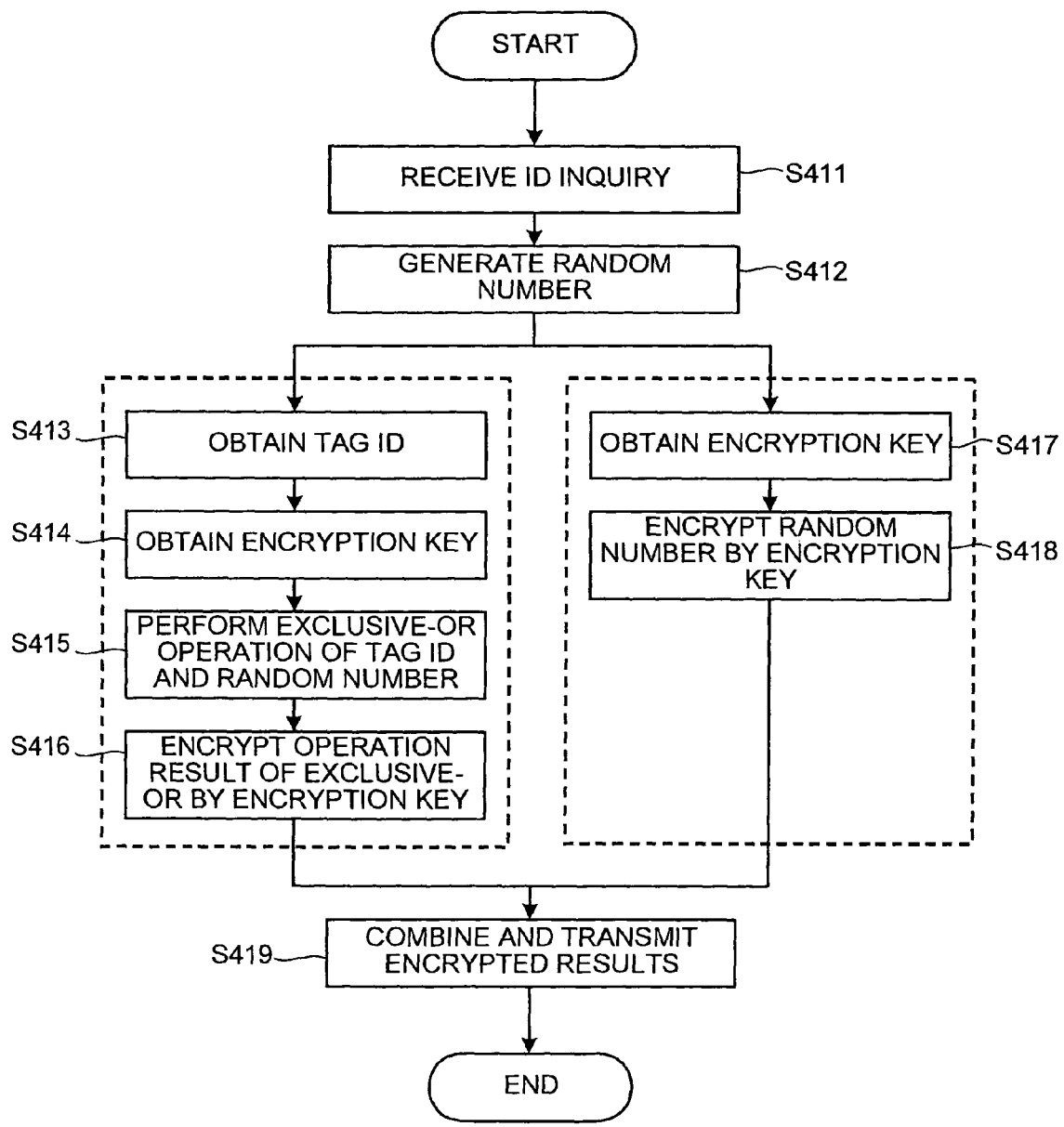
FIG. 13 is a flowchart of a processing procedure performed by the wireless tag shown in FIG. 11.

Processing procedures performed by the wireless tag 1000*d* and the reader/writer 2000*d* will be explained next. FIG. 13 is a flowchart of a processing procedure performed by the wireless tag 1000*d* shown in FIG. 11. In the procedure of FIG. 13, the wireless tag 1000*d* receives an ID inquiry and transmits a reply.

When the wireless tag 1000*d* receives an ID inquiry (step S411), the random number generator 1230 generates a random number (step S412).

The encryption processor 1221*d* obtains the tag ID 1310 (step S413) and obtains the encryption key 1321*d* (step S414). It performs an exclusive-OR operation on the tag ID 1310 and the random number generated by the random number generator 1230 (step S415), and uses the encryption key 1321*d* to encrypt the result of this operation (step S416).

In parallel with the steps S413 to S416, the encryption processor 1222*d* obtains the encryption key 1321*d* (step S417) and uses the encryption key 1321*d* to encrypt the random number (step S418).

When encryption by the encryption processors 1221*d* and 1222*d* is completed, the wireless tag 1000*d* combines the two encrypted results and transmits them to the request source via the communication unit 1100 (step S419).

Figure 14:
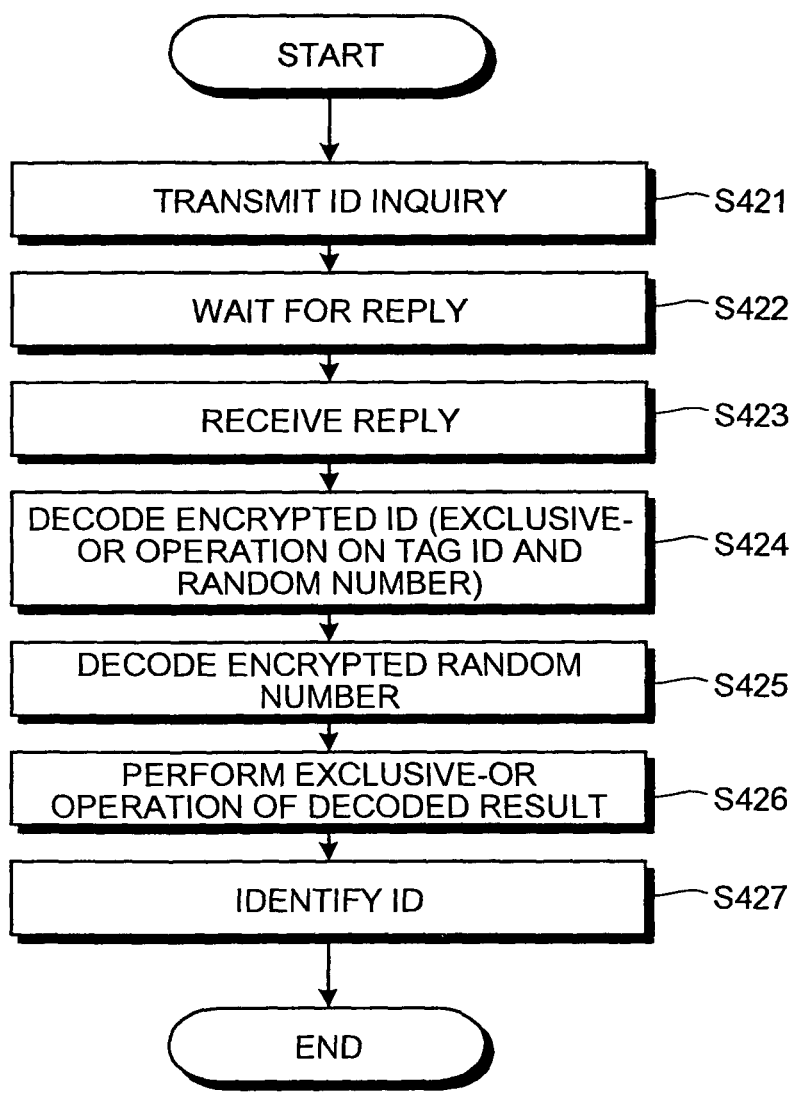
FIG. 14 is a flowchart of a processing procedure performed by the reader/writer shown in FIG. 11.

FIG. 14 is a flowchart of a processing procedure performed by the reader/writer 2000*d* shown in FIG. 11. In the procedure of FIG. 14, the reader/writer 2000*d* transmits an ID inquiry to the wireless tag 1000*d* and identifies the original ID.

The reader/writer 2000*d* transmits an ID inquiry to the wireless tag 1000*d* (step S421) and waits for a reply (step S422). When it receives a reply (step S423), it obtains an encrypted ID and the encrypted random number from the reply data.

The decoding processor 2241*d* decodes the encrypted ID (step S424) and the decoding processor 2242*d* decodes the random number (step S425). An exclusive-OR operation is performed on the decoded ID and the decoded random number (step S426), and the result of this operation is deemed to be the original ID, whereby the identification process ends (step S427).

In the fourth embodiment, a new random number is generated each time the wireless tag 1000*d* receives an ID inquiry, and the ID transmitted in reply is obtained by encrypting the result of an operation performed on a random number and the tag ID 1310. Therefore, even if the wireless tag 1000*d* is a read-only wireless tag, ID transmitted from it can be given confidential variability.

While in the fourth embodiment, the ID in the reply is obtained by encrypting the result of an operation performed on a random number and the tag ID 1310, an ID transmitted from the wireless tag 1000*d* can similarly be given confidential variability when the tag ID 1310 is encrypted by using the result of an operation performed on the random number and the encryption key 1321*d* as a key.

The random number generator 1230 can be replaced with the counter 1400, the value of the counter 1400 being incremented each time the wireless tag 1000*d* receives an ID inquiry and used instead of a random number. This achieves the same advantageous effects.

The encryption processors 1221*d* and 1222*d* can be configured as a single processor instead of as independent processors. In this case, although the encryption process becomes sequential instead of parallel, the circuit size can be reduced.

When the encryption processors 1221*d* and 1222*d* are configured independently, their encryption logics can be different.

While the fourth embodiment gives confidential variability to an ID even in a read-only wireless tag, this method requires two encryption processes each time there is an ID inquiry. In a fifth embodiment of the present invention, the ID is given confidential variability by a single encryption process.

Figure 15:
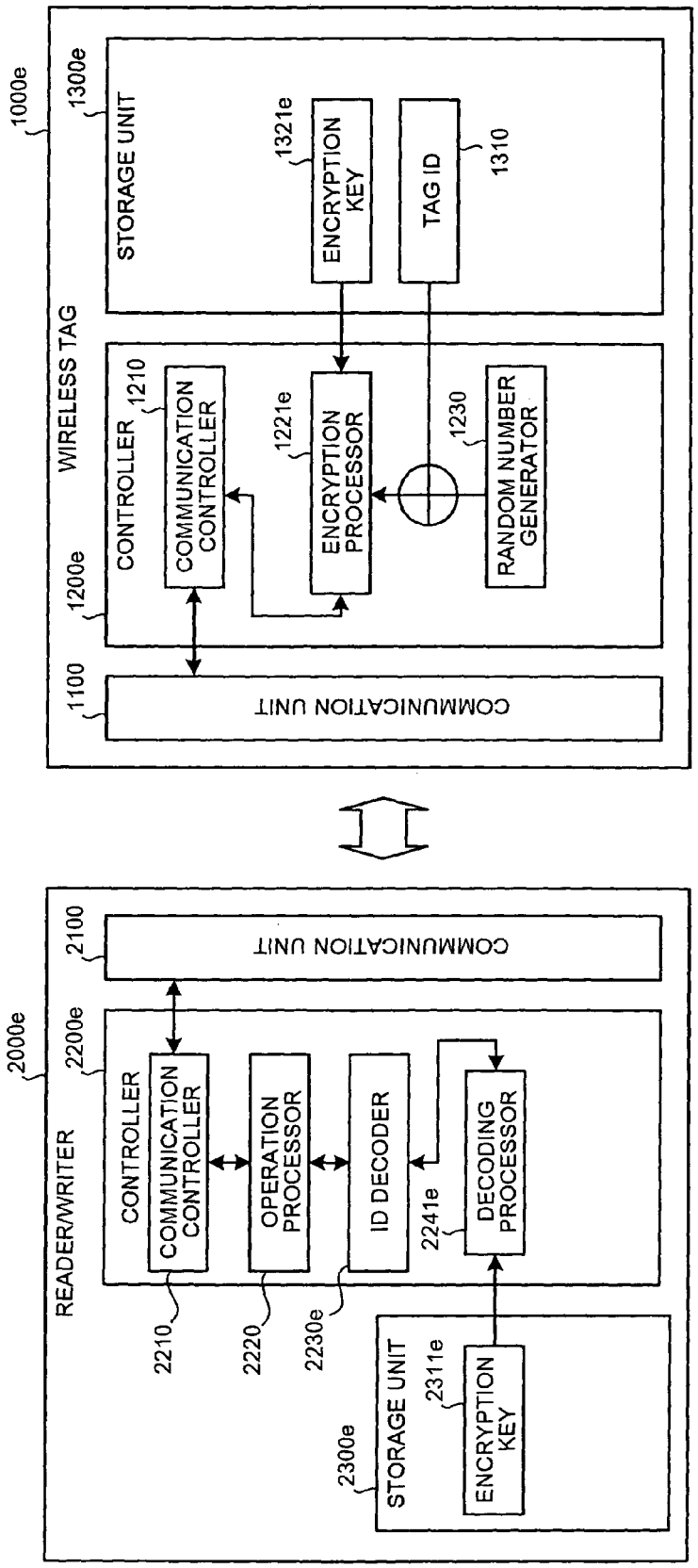
FIG. 15 is a functional block diagram of the configurations of a wireless tag and a reader/writer according to a fifth embodiment of the present invention.

Firstly, the configurations of a wireless tag and a reader/writer according to the fifth embodiment will be explained. FIG. 15 is a functional block diagram of the configurations of the wireless tag and the reader/writer according to the fifth embodiment.

A wireless tag 1000*e* is a device that exchanges IDs and the like with reader/writers such as a reader/writer 2000*e* via wireless communication, and includes the communication unit 1100, a controller 1200*e*, and a storage unit 1300*e*.

The controller 1200*e* controls operations of the wireless tag 1000*e*, and includes the communication controller 1210, an encryption processor 1221*e*, and the random number generator 1230.

The encryption processor 1221*e* encrypts data that combines an ID operation result with a random number. Specifically, the encryption processor 1221*e* performs an exclusive-OR operation on a random number generated by the random number generator 1230 and the tag ID 1310, and uses the encryption key 1321*e* to encrypt data that joins the result of this operation with a random number.

Since the encryption logic of the encryption processor 1221*e* only needs to be decodable, any type of logic can be used. For example, if block logic is used, since the header is a random number, the latter-half ID part also becomes random. Block logic also has an advantage of reducing the load of the decoding process.

The storage unit 1300*e* stores various types of information, and includes a rewritable nonvolatile memory or a combination of a rewritable nonvolatile memory and a non-rewritable memory. The storage unit 1300*e* stores the tag ID 1310 and the encryption key 1321e. The encryption key 1321e is used in encryption processes by the encryption processor 1221e.

The reader/writer 2000e performs predetermined processes by receiving information such as IDs from wireless tags such as the wireless tag 1000e via wireless communication, transmitting information to wireless tags such as the wireless tag 1000e and writing it when required. The reader/writer 2000e includes the communication unit 2100, a controller 2200e, and a storage unit 2300.

The controller 2200e controls operations of the reader/writer 2000e, and includes the communication controller 2210, the operation processor 2220, an ID decoder 2230e, and a decoding processor 2241e.

The ID decoder 2230e is a processor that restores an encrypted ID and determines the original ID. Specifically, the ID decoder 2230e decodes joined data that is transmitted from a wireless tag such as the wireless tag 1000e by sending it to the decoding processor 2241e, obtains an ID operation result and a random number from the decoded result, performs an exclusive-OR operation to the ID operation result and the random number, and deems the result of this operation to be the original ID.

The decoding processor 2241e uses the encryption key 2311e to decode the joined data encrypted by the encryption processor 1221e. The encryption logic of the decoding processor 2241e corresponds to the encryption logic of the encryption processor 1221e.

The storage unit 2300e stores various types of information, and stores the encryption key 2311e. The encryption key 2311e is used in decoding by the decoding processor 2241e, and has the same value as the encryption key 1321e.

Figure 16:
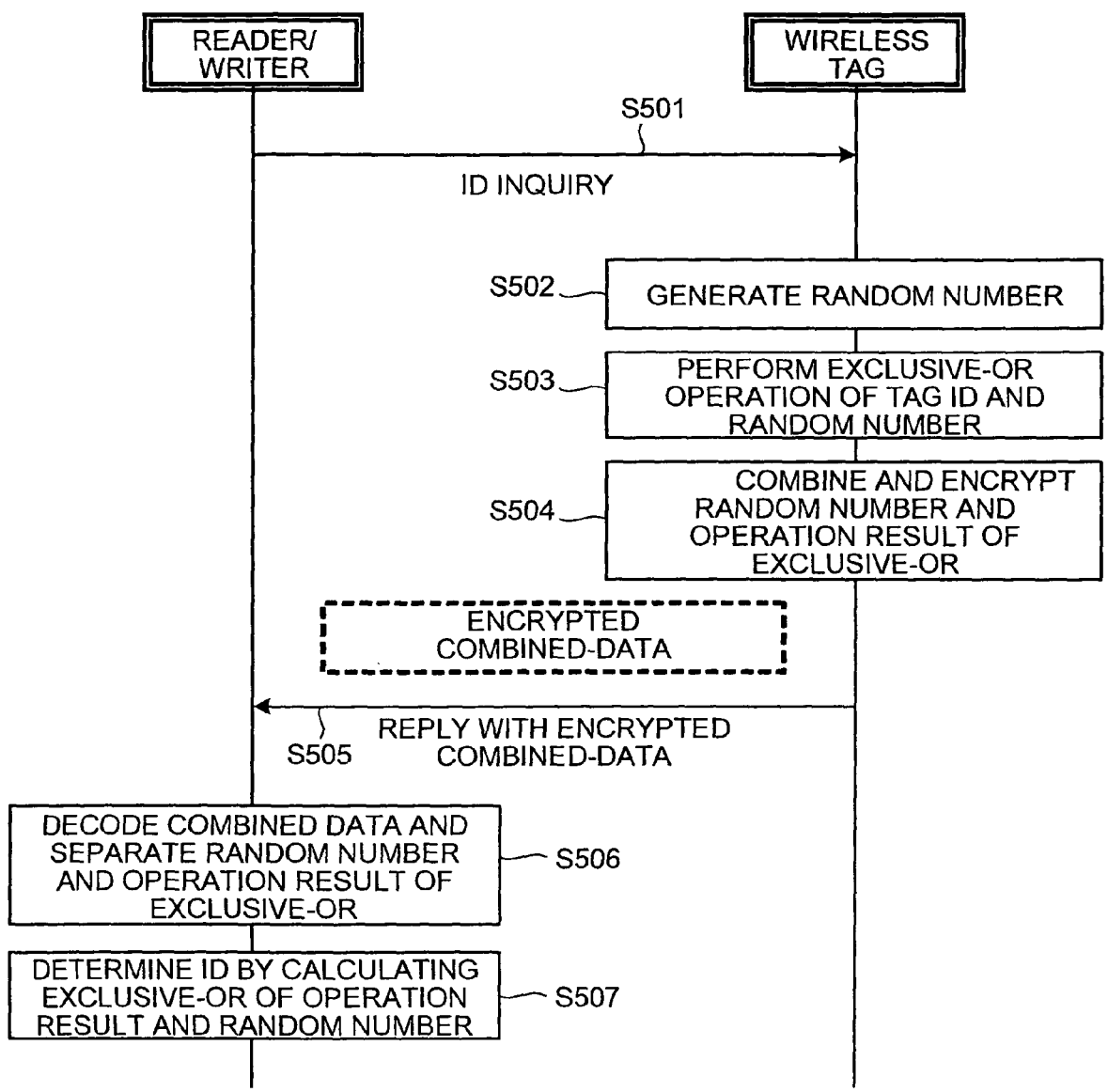
FIG. 16 is a sequence diagram of an exchange between the wireless tag and the reader/writer shown in FIG. 15.

A procedure for exchanging information between the wireless tag 1000e and the reader/writer 2000e will be explained next. FIG. 16 is a sequence diagram of an exchange between the wireless tag 1000e and the reader/writer 2000e shown in FIG. 15. In the procedure of FIG. 16, the reader/writer 2000e transmits an ID inquiry to the wireless tag 1000e and identifies the ID.

When the reader/writer 2000e transmits an ID inquiry to the wireless tag 1000e (step S501), the wireless tag 1000e uses the random number generator 1230 to generate a random number (step S502). It then performs an exclusive-OR operation on the random number and the ID 1310 (step S503), joins the random number and the operation result, and encrypts them (step S504). The wireless tag 1000e transmits the encrypted joined data in a reply to the reader/writer 2000e (step S505).

The reader/writer 2000e decodes the encrypted joined data, separating it into the random number and the operation result (step S506), obtains the original ID by performing an exclusive-OR operation on the operation result and the random number, and uses it in various processes (step S507).

Figure 17:
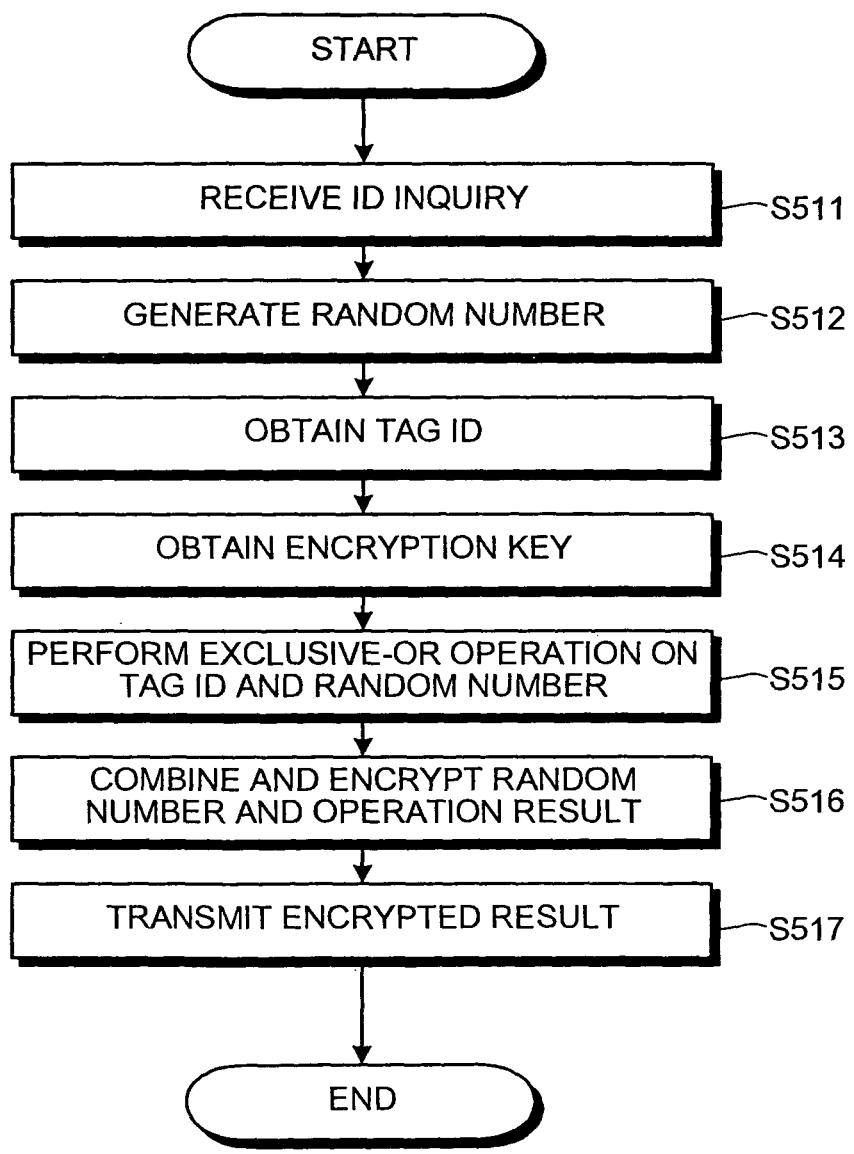
FIG. 17 is a flowchart of a processing procedure performed by the wireless tag shown in FIG. 15.

Processing procedures performed by the wireless tag 1000e and the reader/writer 2000e will be explained next. FIG. 17 is a flowchart of a processing procedure performed by the wireless tag 1000e shown in FIG. 15. In the procedure of FIG. 17, the wireless tag 1000e receives an ID inquiry and transmits a reply.

When the wireless tag 1000e receives an ID inquiry (step S511), the random number generator 1230 generates a random number (step S512).

The encryption processor 1221e obtains the tag ID 1310 (step S513) and obtains the encryption key 1321e (step S514). The encryption processor 1221e performs an exclusive-OR operation on the tag ID 1310 and the random number generated by the random number generator 1230 (step S515), and uses the encryption key 1321e to encrypt data that joins the random number to the result of this operation (step S516).

When encryption by the encryption processor 1221e is completed, the wireless tag 1000e transmits the encrypted result to the request source via the communication unit 1100 (step S517).

Figure 18:
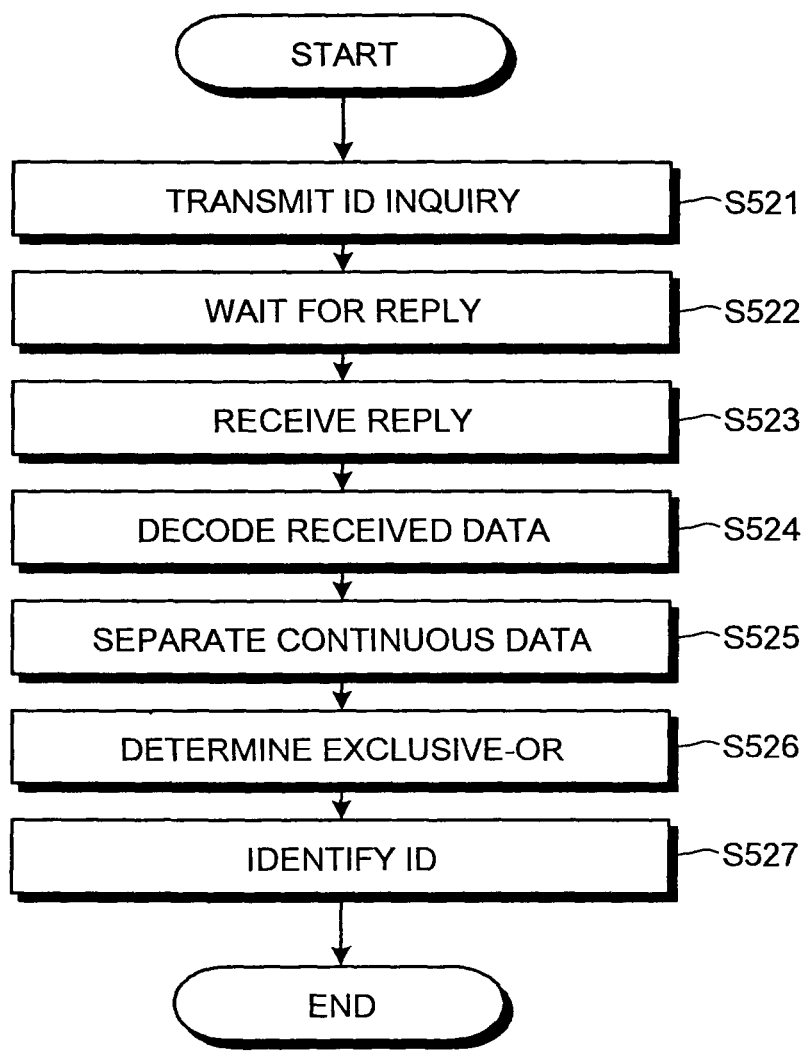
FIG. 18 is a flowchart of a processing procedure performed by the reader/writer shown in FIG. 15.

FIG. 18 is a flowchart of a processing procedure performed by the reader/writer 2000e shown in FIG. 15. In the procedure of FIG. 18, the reader/writer 2000e transmits an ID inquiry to the wireless tag 1000e and identifies the original ID.

The reader/writer 2000e transmits an ID inquiry to the wireless tag 1000e (step S521) and waits for a reply (step S522). When it receives a reply (step S523), it decodes the reply data in the decoding processor 2241e (step S524).

The reader/writer 2000e separates the decoded data into the random number and the ID operation result (step S525), performs an exclusive-OR operation on the ID operation result and the random number (step S526), and deems the result to be the original ID, whereby the identification process ends (step S527).

In the fifth embodiment, the wireless tag 1000e replies to an ID inquiry by transmitting an encryption of data that joins a random number to an operation result on the original ID. Therefore, the ID transmitted from the wireless tag 1000e can be given confidential variability by a single decoding process.

While in the fifth embodiment, the ID in the reply is an encryption of data that joins a random number to an operation result on the tag ID 1310, the ID transmitted from the wireless tag 1000e can similarly be given confidential variability when data that joins a recording medium and the tag ID 1310 is encrypted by using a key that is acquired as the result of performing an exclusive-OR operation on a recording medium and the encryption key 1321e.

The random number generator 1230 can be replaced with the counter 1400, the value of the counter 1400 being incremented each time the wireless tag 1000e receives an ID inquiry and used instead of a random number. This achieves the same advantageous effects.

While the fifth embodiment gives confidential variability to an ID transmitted by a wireless tag, depending on the algorithm of the encryption, there is a risk that the encryption key can be exposed by making ID repeated inquiries and analyzing the results. To counter this, a sixth embodiment of the present invention describes an example of a wireless tag that suppresses replying for a fixed period of time after replying to an ID inquiry.

Figure 19:
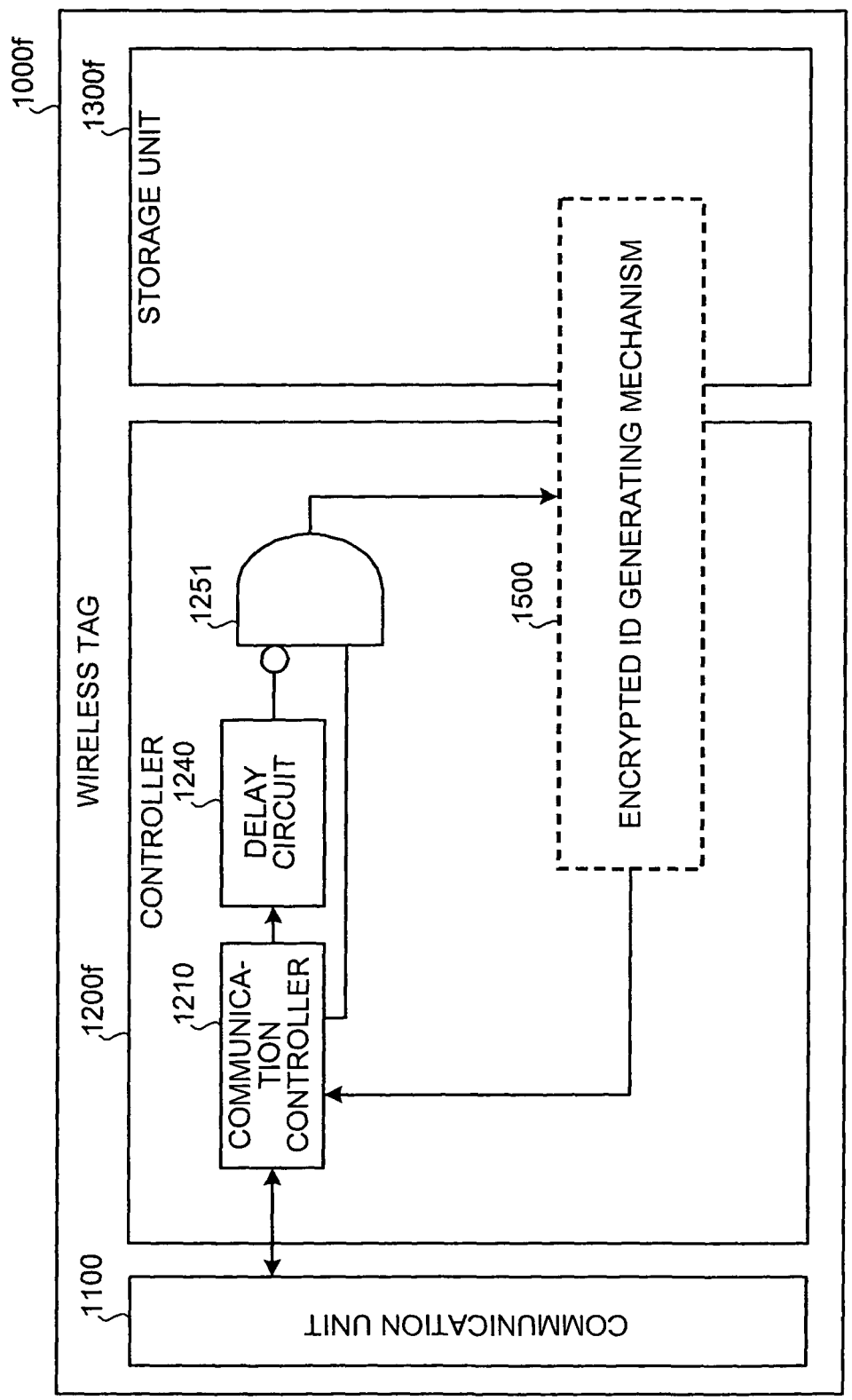
FIG. 19 is a functional block diagram of the configuration of a wireless tag according to a sixth embodiment of the present invention.

Firstly, the configuration of a wireless tag according to the sixth embodiment will be explained. FIG. 19 is a functional block diagram of the configuration of the wireless tag according to the sixth embodiment.

A wireless tag 1000f is a device that exchanges IDs and the like with reader/writers via wireless communication, and includes the communication unit 1100, a controller 1200f, a storage unit 1300f, and an encrypted ID generating mechanism 1500. The encrypted ID generating mechanism 1500 gives confidential variability to an ID, and includes one of the methods of the first to the fifth embodiments, or another method.

The controller 1200f controls operations of the wireless tag 1000f, and includes the communication controller 1210, a delay circuit 1240, and an AND circuit 1251.

The output of the delay circuit 1240 switches ON for a fixed period of time when an input signal switches ON. The delay circuit 1240 connects to the communication controller 1210, and its input signal switches ON when the wireless tag 1000f replies to an ID inquiry.

Two signals are input to the AND circuit 1251. When both these signals are ON, a signal that commands the encrypted ID generating mechanism 1500 to generate an encrypted ID switches ON. One of the signals input to the AND circuit 1251 switches ON when the wireless tag 1000f receives an ID inquiry. The other signal is an inversion of the signal output from the delay circuit 1240.

According to this configuration, after the wireless tag 1000f replies to an ID inquiry, it does not reply to another ID inquiry for a fixed period of time. Exposure of the encryption key due to continuous inquiries can be prevented by providing this period during which no ID inquiries are replied to.

Figure 20:
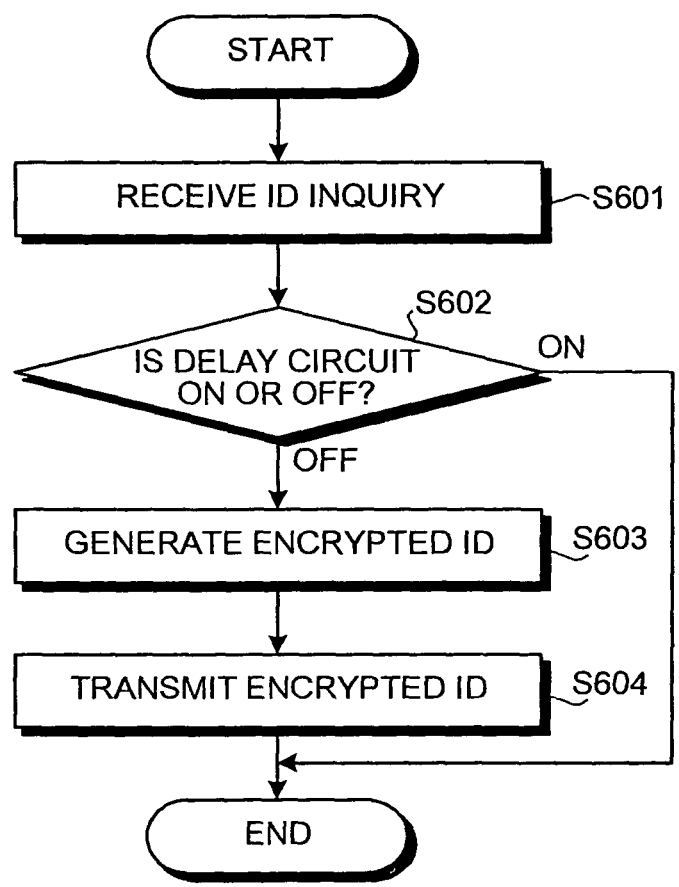
FIG. 20 is a flowchart of a processing procedure performed by the wireless tag shown in FIG. 19.

A processing procedure performed by the wireless tag 1000f will be explained next. FIG. 20 is a flowchart of a processing procedure performed by the wireless tag 1000f shown in FIG. 19. In the procedure of FIG. 20, the wireless tag 1000f receives an ID inquiry and replies to it.

When the wireless tag 1000f receives an ID inquiry (step S601), the process branches according to the status of the delay circuit 1240.

When the output of the delay circuit 1240 is OFF, that is, when a fixed period of time has elapsed from the previous ID reply (step S602: OFF), the encrypted ID generating mechanism 1500 generates an encrypted ID (step S603) and the wireless tag 1000f transmits this ID via the communication unit 1100 to the request source (step S604).

When the output of the delay circuit 1240 is ON, that is, when a fixed period of time from the previous ID reply has not yet elapsed (step S602: ON), no process is performed in reply to the ID inquiry.

In the sixth embodiment, no reply is made to ID inquiries for a fixed period of time after replying to one. This prevents exposure of the encryption key due to continuous inquiries.

While the sixth embodiment describes a method where, to prevent exposure of the encryption key, no reply is made to ID inquiries for a fixed period of time after replying to one, inconvenience can be caused by not replying to legitimate inquiries. Accordingly, a seventh embodiment of the present invention describes a method that replies with an identical ID after a fixed period of time elapses after replying to an ID inquiry.

Figure 21:
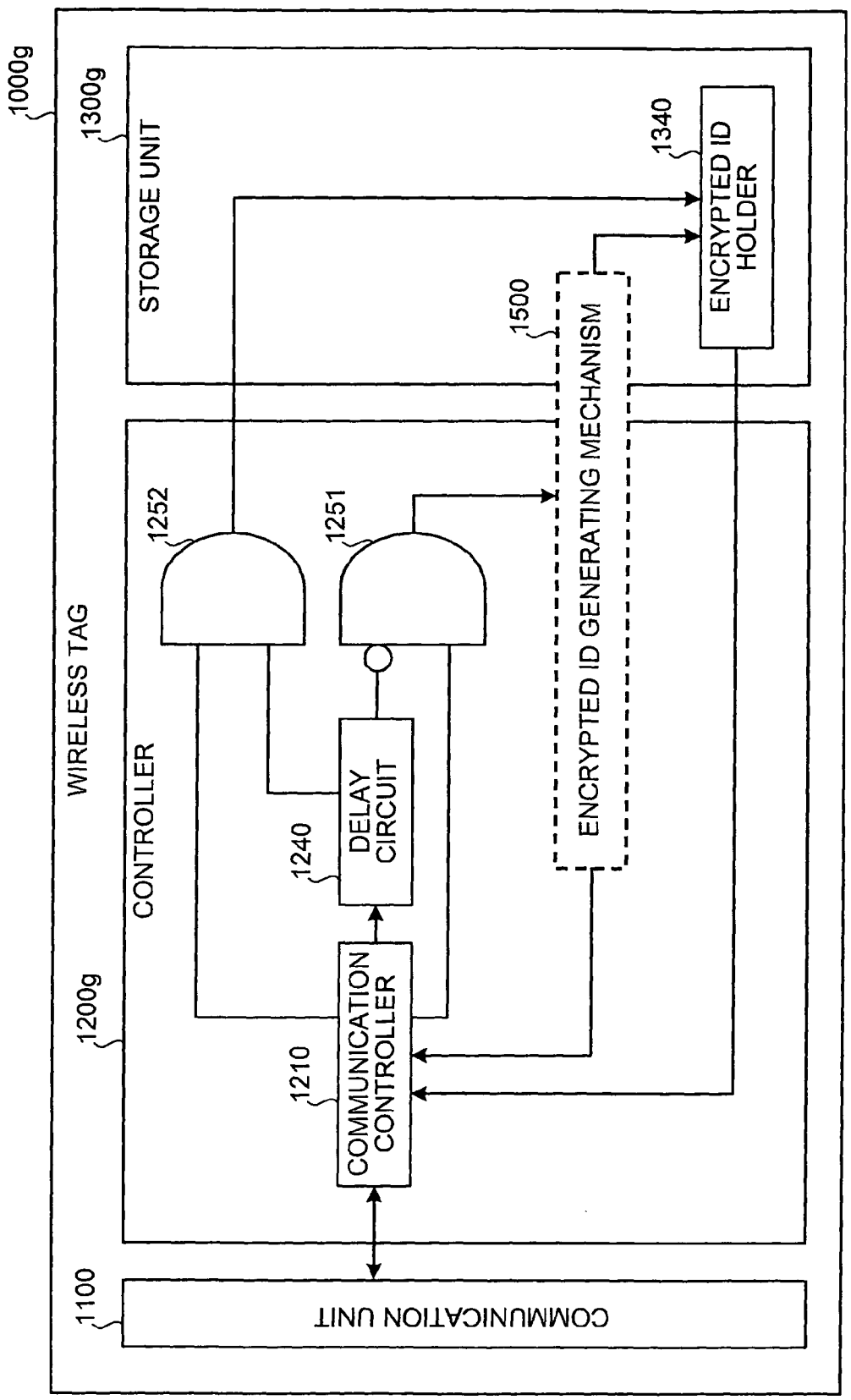
FIG. 21 is a functional block diagram of the configuration of a wireless tag according to a seventh embodiment of the present invention.

Firstly, the configuration of a wireless tag according to the seventh embodiment will be explained. FIG. 21 is a functional block diagram of the configuration of the wireless tag according to the seventh embodiment. There are two differences between a wireless tag 1000g of the seventh embodiment and the wireless tag 1000f of the sixth embodiment.

A first difference is that the storage unit 1300g of the wireless tag 1000g includes an encrypted ID holder 1340. The encrypted ID holder 1340 holds the last ID generated by the encrypted ID generating mechanism 1500.

A second difference is that the controller 1200g includes an AND circuit 1252. Two signals are input to the AND circuit 1252. When both signals are ON, a signal that commands the encrypted ID holder 1340 to transmit an ID it is holding switches ON. One of the signals input to the AND circuit 1252 switches ON when the wireless tag 1000g receives an ID inquiry. The other signal is the signal output from the delay circuit 1240.

According to this configuration, during a fixed period of time after replying to an ID inquiry, the wireless tag 1000g replies by transmitting the ID held in the encrypted ID holder 1340. By transmitting the same ID in reply to ID inquiries for a fixed period of time, it is possible prevent the encryption key from becoming exposed due to continuous inquiries while responding properly to legitimate inquiries.

Figure 22:
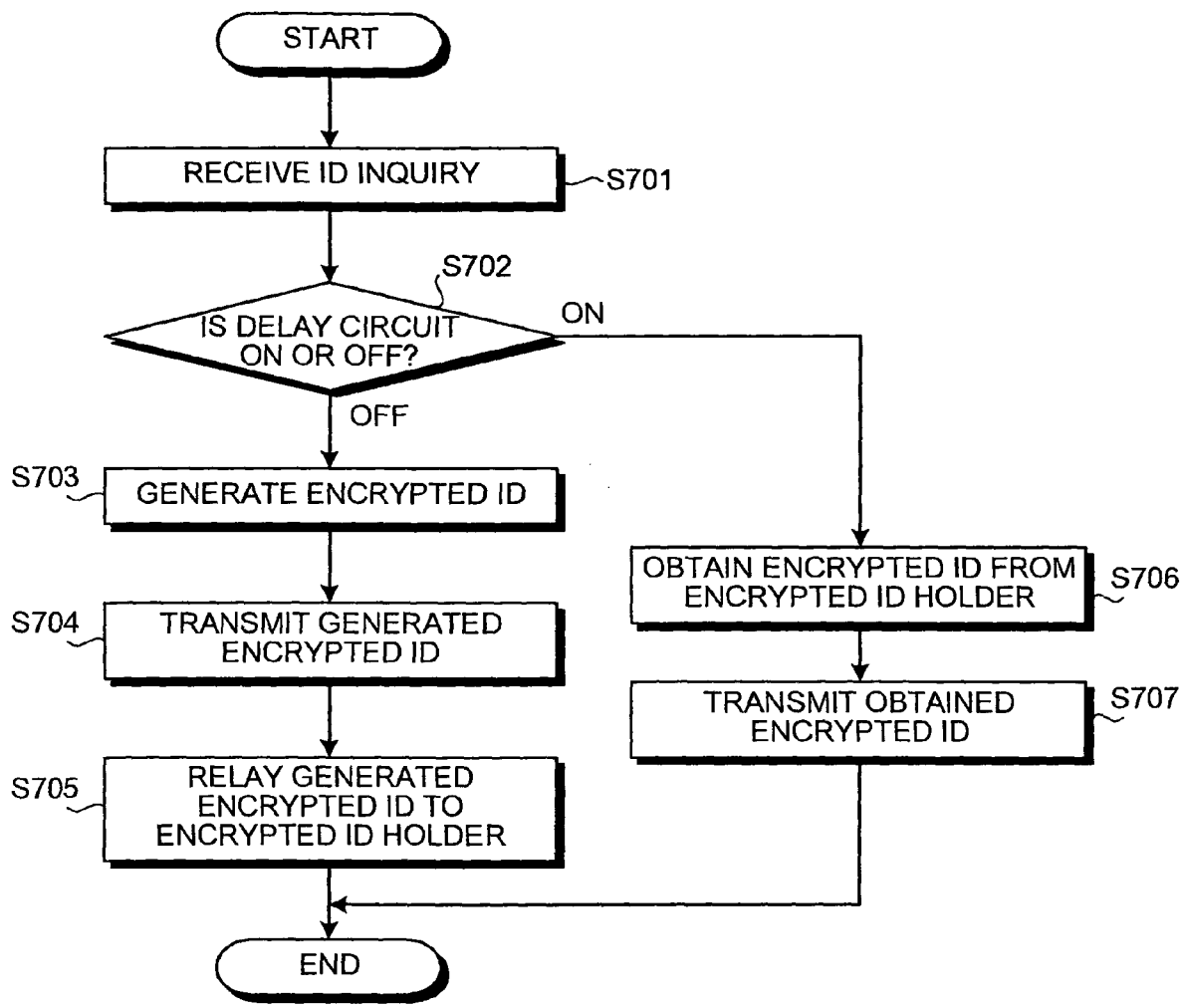
FIG. 22 is a flowchart of a processing procedure performed by the wireless tag shown in FIG. 21.

A processing procedure performed by the wireless tag 1000g will be explained next. FIG. 22 is a flowchart of a processing procedure performed by the wireless tag 1000g shown in FIG. 11. In the procedure of FIG. 22, the wireless tag 1000g receives an ID inquiry and replies to it.

When the wireless tag 1000g receives an ID inquiry (step S701), the process branches according to the status of the delay circuit 1240.

When the output of the delay circuit 1240 is OFF, that is, when a fixed period of time has elapsed from the previous ID reply (step S702: OFF), the encrypted ID generating mechanism 1500 generates an encrypted ID (step S703) and transmits it via the communication unit 1100 to the request source (step S704). This ID is then held in the encrypted ID holder 1340 (step S705).

When the output of the delay circuit 1240 is ON, that is, when a fixed period of time from the previous ID reply has not yet elapsed (step S702: ON), the wireless tag 1000g obtains the ID held in the encrypted ID holder 1340 (step S706) and transmits this value to the request source via the communication unit 1100 (step S707).

In the seventh embodiment, for a fixed period of time after replying to an ID inquiry, the same ID is transmitted in reply. This prevents exposure of the encryption key due to continuous inquiries, and makes it possible to respond properly to legitimate inquiries.

As wireless tags that give confidential variability to IDs, such as the one described in the present specification, proliferate, there is likely to be a period of coexistence with conventional wireless tags that reply with fixed IDs. During this period of coexistence, it is convenient to make the wireless tag reply initially with a fixed ID, and, after replying to the reader/writer or the like, to perform a predetermined operation to make the wireless tag reply with an ID having confidential variability. An eighth embodiment of the present invention describes a method for realizing this type of ID switching function.

Figure 23:
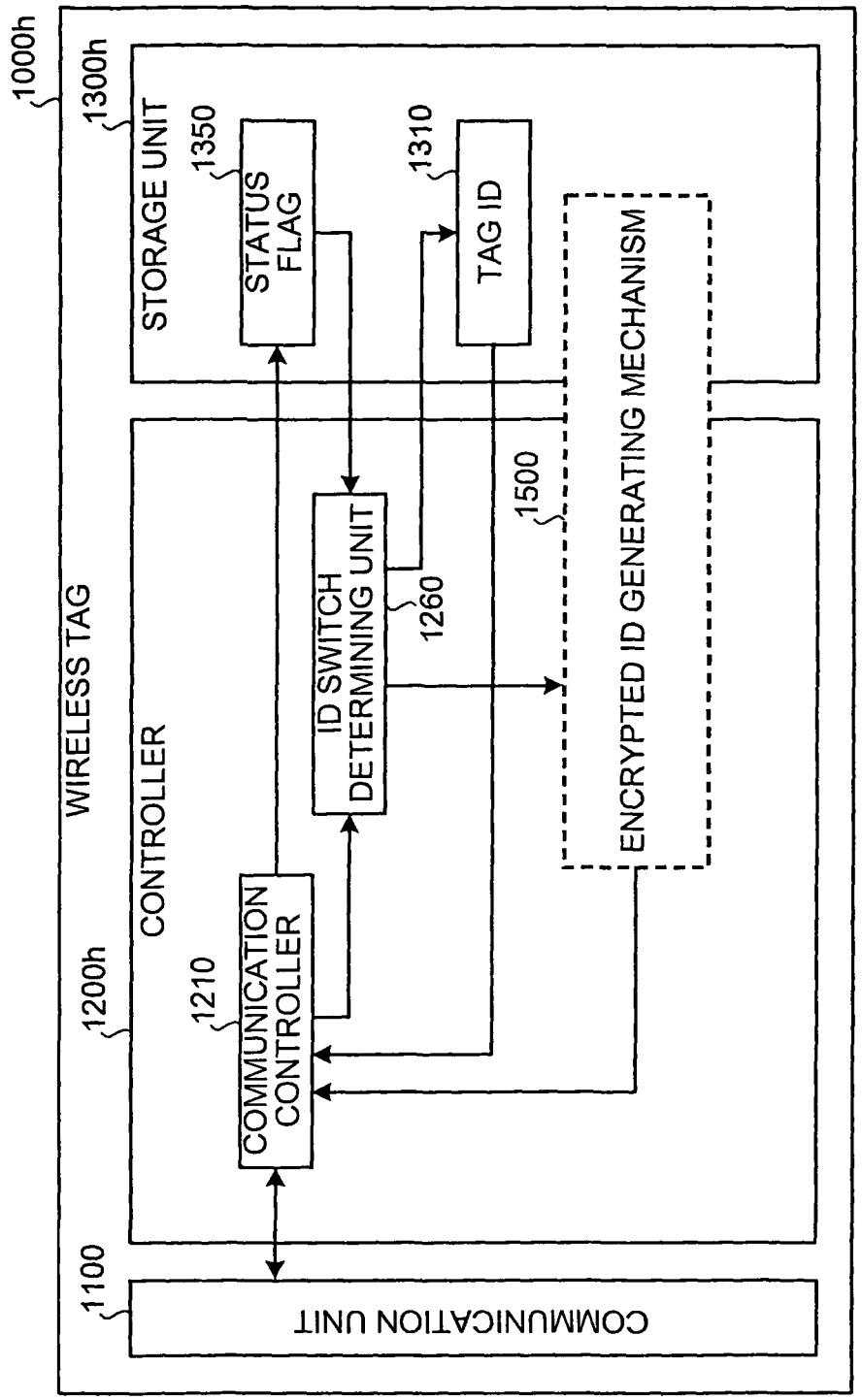
FIG. 23 is a functional block diagram of the configuration of a wireless tag according to an eighth embodiment of the present invention.

Firstly, the configuration of a wireless tag according to the eighth embodiment will be explained. FIG. 23 is a functional block diagram of the configuration of the wireless tag according to the eighth embodiment.

A wireless tag 1000h is a device that exchanges IDs and the like with reader/writers via wireless communication, and includes the communication unit 1100, a controller 1200h, a storage unit 1300h, and the encrypted ID generating mechanism 1500.

The controller 1200h controls operations of the wireless tag 1000h, and includes the communication controller 1210 and an ID switch determining unit 1260.

The ID switch determining unit 1260 is a processor that determines whether to reply to an ID inquiry with a fixed ID or an ID having confidential variability. Specifically, if a status flag 1350 of the storage unit 1300h indicates that the reply should be a fixed ID, the ID switch determining unit 1260 replies by transmitting the unaltered value of the tag ID 1310. On the other hand, if the status flag 1350 indicates that the reply should be an ID having confidential variability, the ID switch determining unit 1260 replies by transmitting an ID generated by the encrypted ID generating mechanism 1500.

The storage unit 1300h stores various types of information, and includes the status flag 1350 and the tag ID 1310. The status flag 1350 indicates whether to reply to an ID inquiry with a fixed ID or an ID having confidential variability. In its initial status, the status flag 1350 indicates that the reply should be a fixed ID, and switches to indicating that the reply should be an ID having confidential variability when a reader/writer writes predetermined data.

While in the other embodiments, the tag ID 1310 is included in the encrypted ID generating mechanism 1500, for sake of convenience in the eighth embodiment, the tag ID 1310 is provided outside the encrypted ID generating mechanism 1500.

Figure 24:
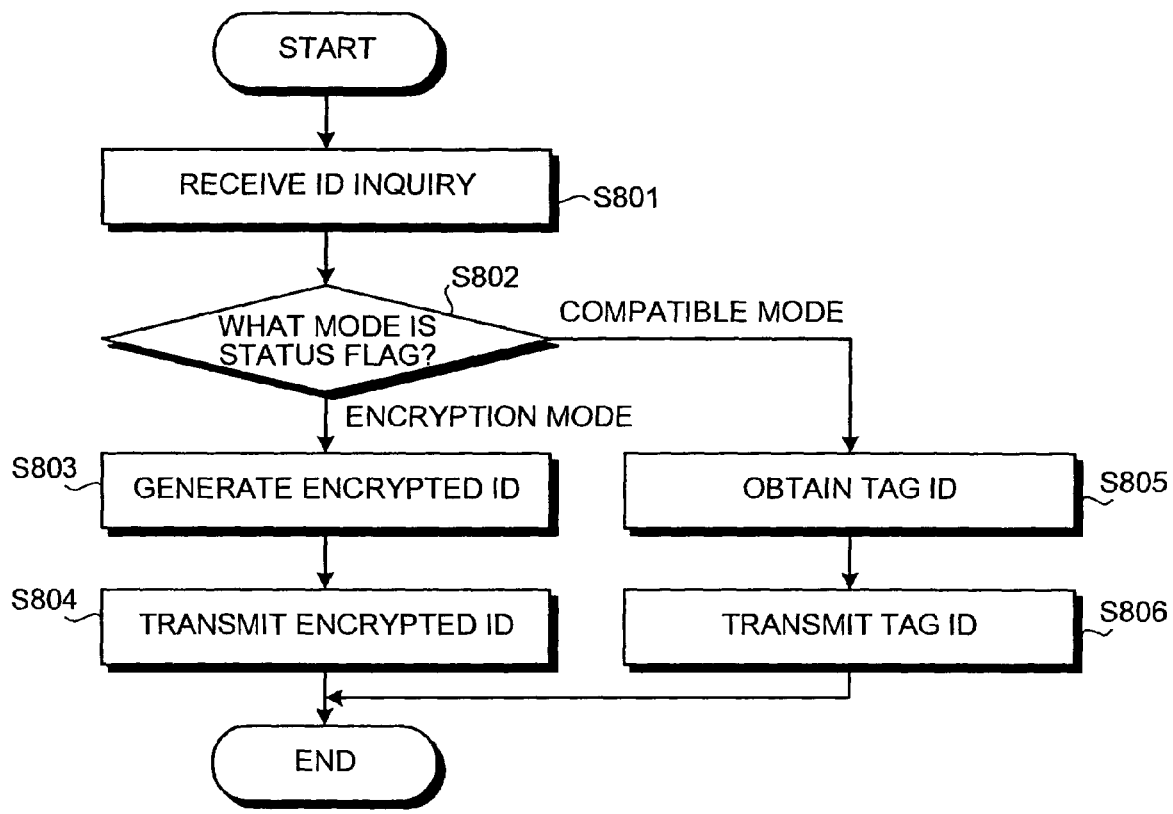
FIG. 24 is a flowchart of a processing procedure performed by the wireless tag shown in FIG. 23.

A processing procedure performed by the wireless tag 1000*h* will be explained next. FIG. 24 is a flowchart of a processing procedure performed by the wireless tag 1000*h* shown in FIG. 23. In the procedure of FIG. 24, the wireless tag 1000*h* receives an ID inquiry and replies to it.

When the wireless tag 1000*h* receives an ID inquiry (step S801), the process branches according to the status of the status flag 1350.

When the status flag 1350 is in encryption mode, that is, when it is indicating that the reply should be an ID having confidential variability (step S802: Encryption Mode), the encrypted ID generating mechanism 1500 generates an encrypted ID (step S803) and the wireless tag 1000*h* transmits this via the communication unit 1100 to the request source (step S804).

When the status flag 1350 is in fixed mode, that is, when it is indicating that the reply should be a fixed ID (step S802: Fixed Mode), the wireless tag 1000*h* obtains the tag ID 1310 (step S805) and transmits it via the communication unit 1100 to the request source (step S806).

As described above in the eighth embodiment, it is determined whether to reply with a fixed ID or an ID having confidential variability according to the status of the status flag 1350. Therefore, a wireless tag that can reply with an ID having communication charge from the previous month can be used during coexistence with a wireless tag that can only reply with a fixed ID.

In an anticollision function that authenticates IDs of a plurality of wireless tags simultaneously, an ID is usually read in each bit by using a binary tree search. To make a wireless tag that gives confidential variability to IDs compatible with this anticollision function, the ID must be fixed during the binary tree search. However, if the ID is fixed unconditionally, it will be possible to read the same ID any number of times, leading to a risk that the ID can be tracked. A ninth embodiment of the present invention describes a method that can be applied in an anticollision function while preventing tracking.

Figure 25:
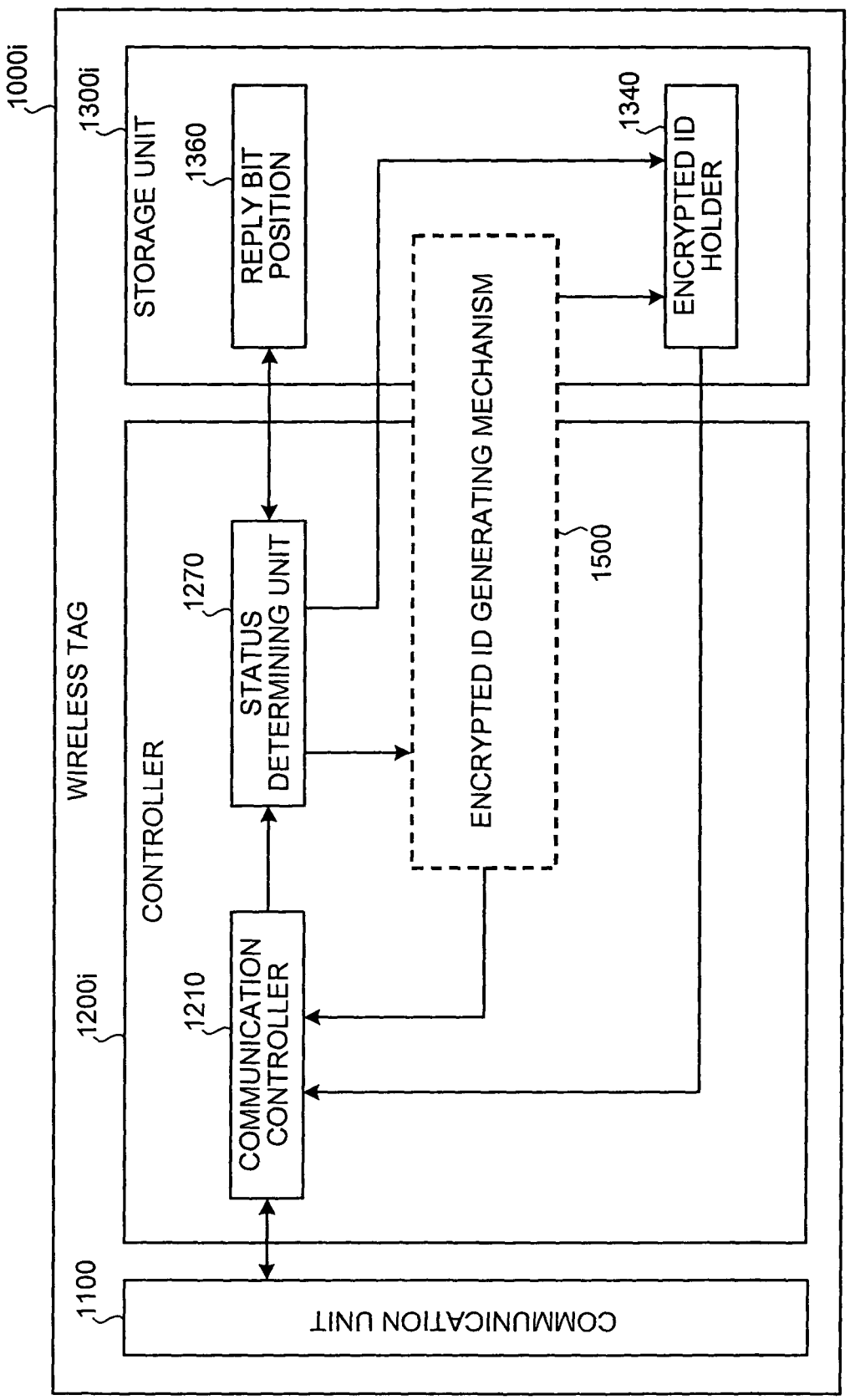
FIG. 25 is a functional block diagram of the configuration of a wireless tag according to a ninth embodiment of the present invention.

Firstly, the configuration of a wireless tag according to the ninth embodiment will be explained. FIG. 25 is a functional block diagram of the configuration of the wireless tag according to the ninth embodiment.

A wireless tag 1000*i* is a device that exchanges IDs and the like with reader/writers via wireless communication, and includes the communication unit 1100, a controller 1200*i*, a storage unit 1300*i*, and the encrypted ID generating mechanism 1500.

The controller 1200*i* controls operations of the wireless tag 1000*i*, and includes the communication controller 1210 and a status determining unit 1270.

The status determining unit 1270 is a processor that determines whether a binary tree search by the anticollision function is being performed according to a valid procedure, and, if it determines that the procedure is invalid, regenerates an ID. Specifically, it stores a bit position that is read during the binary tree search at a reply bit position 1360 of the storage unit 1300*i*, and determines whether the procedure is valid by comparing the value of that bit with a newly requested bit position.

The storage unit 1300*i* stores various types of information, and includes the encrypted ID holder 1340 and the reply bit position 1360. The encrypted ID holder 1340 stores the last ID generated by the encrypted ID generating mechanism 1500, and the reply bit position 1360 stores the bit position where the ID stored in the encrypted ID holder 1340 is last read in the binary tree search.

Figure 26:
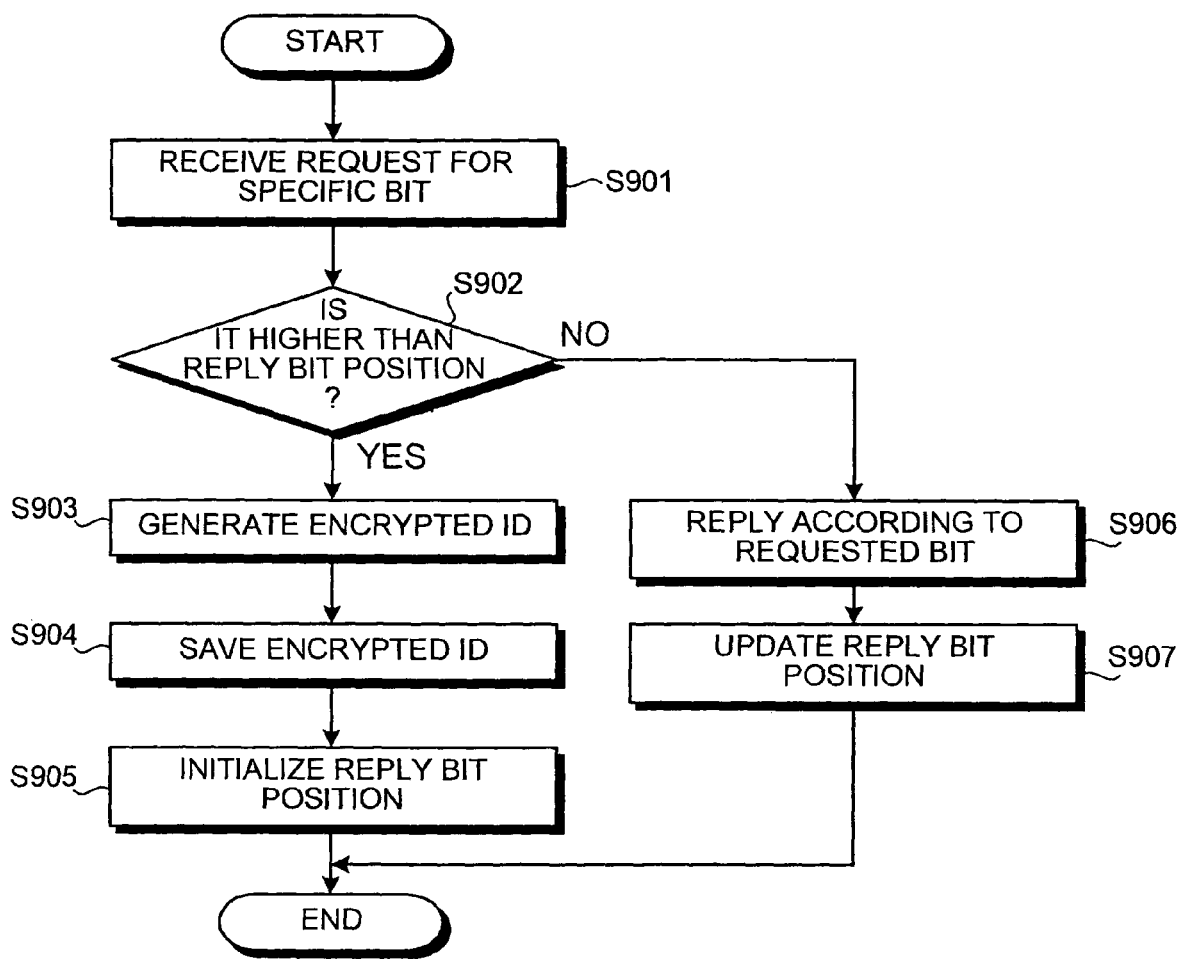
FIG. 26 is a flowchart of a processing procedure performed by the wireless tag shown in FIG. 25.

A processing procedure performed by the wireless tag 1000*i* will be explained next. FIG. 26 is a flowchart of a processing procedure performed by the wireless tag 1000*i* shown in FIG. 25. In the procedure of FIG. 26, the wireless tag 1000*i* receives a read request of a binary tree search. It is assumed here that, in a valid binary tree search, requests are made sequentially from the top bit.

When the wireless tag 1000*i* receives a request for a specific bit (step S901), it compares the requested bit position with the bit position held at the reply bit position 1360.

When the requested bit position is higher than the bit position held at the reply bit position 1360 (step S902: Yes), the wireless tag 1000*i* determines that the binary tree search is performed by an invalid procedure, generates a new ID in the encrypted ID generating mechanism 1500 (step S903), stores the ID in the encrypted ID holder 1340 (step S904), and initializes the reply bit position 1360 (step S905).

When the requested bit position is lower than the bit position held at the reply bit position 1360 (step S902: No), the wireless tag 1000*i* determines that the binary tree search is performed by a valid procedure, transmits a reply that accords with the requested bit position by referring to the encrypted ID holder 1340 (step S906), and stores the requested bit position at the reply bit position 1360 (step S907).

As described above in the ninth embodiment, the bit position that is last requested in the binary tree search is stored at the reply bit position 1360, and it is determined whether the binary tree search is performed by a valid procedure by comparing a newly requested bit position with the value of the reply bit position 1360. This enables a wireless tag that gives confidential variability to an ID to be made compatible with the anticollision function, while preventing the ID from being tracked by multiple searches.

Alternatively, the storage unit 1300*i* can include regions corresponding to each bit of the ID, the request status of each bit of the ID being recorded in these regions. If the same bit is requested a predetermined number of times or more, it is determined that the binary tree search is invalid.

The above embodiments describe methods for giving confidential variability to an ID transmitted from the wireless tag to the reader/writer. However, there is a possibility that data transmitted from the reader/writer to the wireless tag can be intercepted and the unique ID is leaked. Signals transmitted by the reader/writer are easier to intercept, since they propagate further than those from the wireless tag.

A tenth embodiment of the present invention describes a method that can prevent leakage of the unique ID due to interception of information that is transmitted from the reader/writer to the wireless tag. While the tenth embodiment describes an example where a random number is used in giving confidential variability to the ID of a wireless tag, a counter value can be used instead of the random number.

Figure 27:
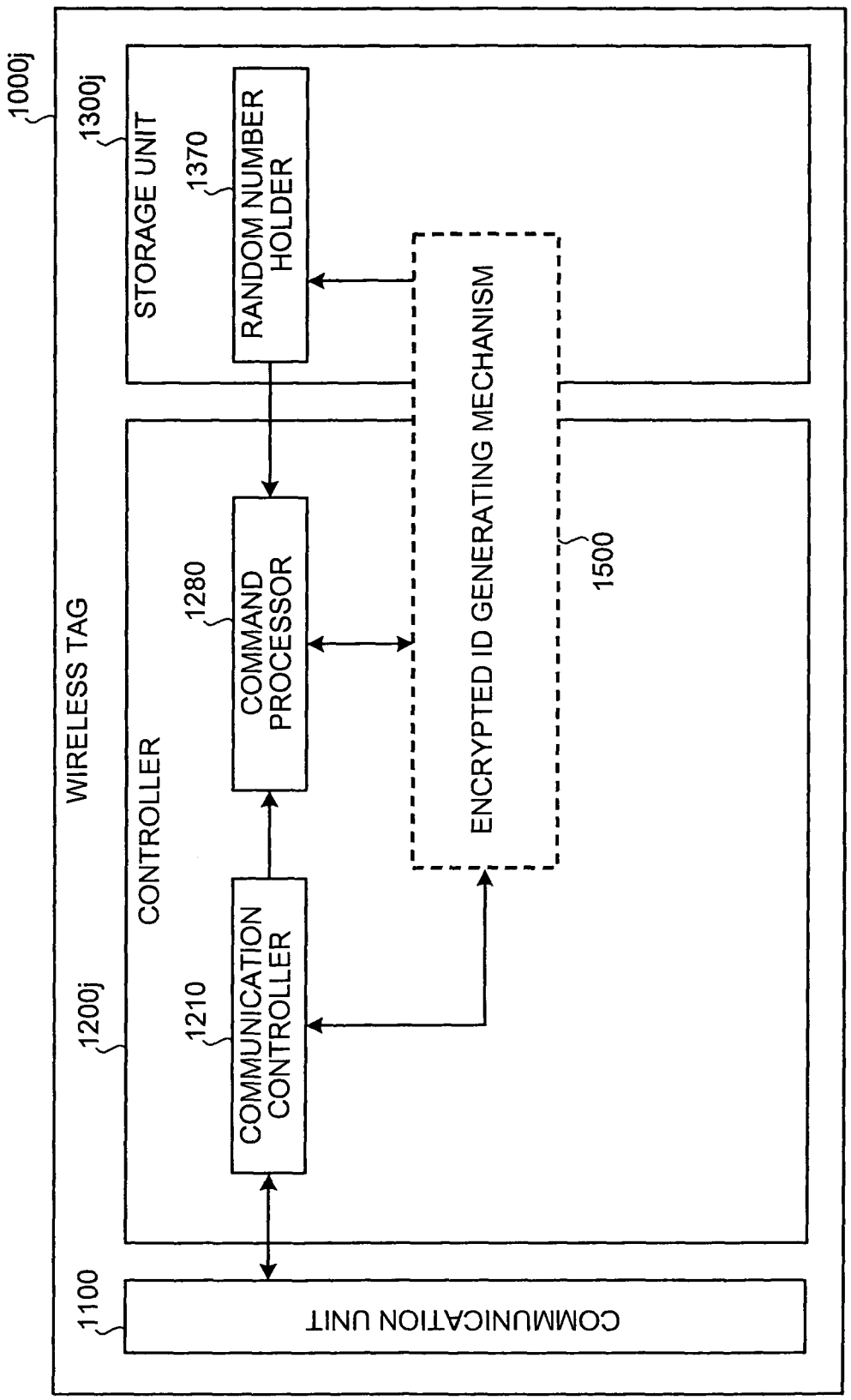
FIG. 27 is a functional block diagram of the configuration of a wireless tag according to a tenth embodiment of the present invention.

Firstly, the configuration of a wireless tag according to the tenth embodiment will be explained. FIG. 27 is a functional block diagram of the configuration of the wireless tag according to the tenth embodiment.

A wireless tag 1000*j* is a device that exchanges IDs and the like with reader/writers via wireless communication, and includes the communication unit 1100, a controller 1200*j*, a storage unit 1300*j*, and the encrypted ID generating mechanism 1500.

The controller 1200*j* controls operations of the wireless tag 1000*j*, and includes the communication controller 1210 and a command processor 1280. The command processor 1280 processes a command transmitted from the reader/writer, and determines whether the command is destined for itself based on whether a random number that is transmitted simultaneously with the command is one generated by this wireless tag.

A command transmitted from a reader/writer can be received by a plurality of wireless tags. A reader/writer of this embodiment stores random numbers, obtained when ID replies are received from wireless tags, in correspondence with the IDs. When transmitting a command to a specific wireless tag, the reader/writer specifies the target wireless tag by transmitting a random number that corresponds to that wireless tag together with the command.

Thus, without directly using the ID, the tag that is the target of the request is specified by using the random number that the wireless tag transmitted with its ID reply. This eliminates any risk of the ID being leaked due to interception of transmission data from the reader/writer.

The storage unit 1300*j* stores various types of information, and includes a random number holder 1370. The random number holder 1370 stores the last random number generated by the encrypted ID generating mechanism 1500. The random number stored here is used in determining, when the command processor 1280 receives a random number from the reader/writer, whether that random number is generated by this wireless tag.

Figure 28:
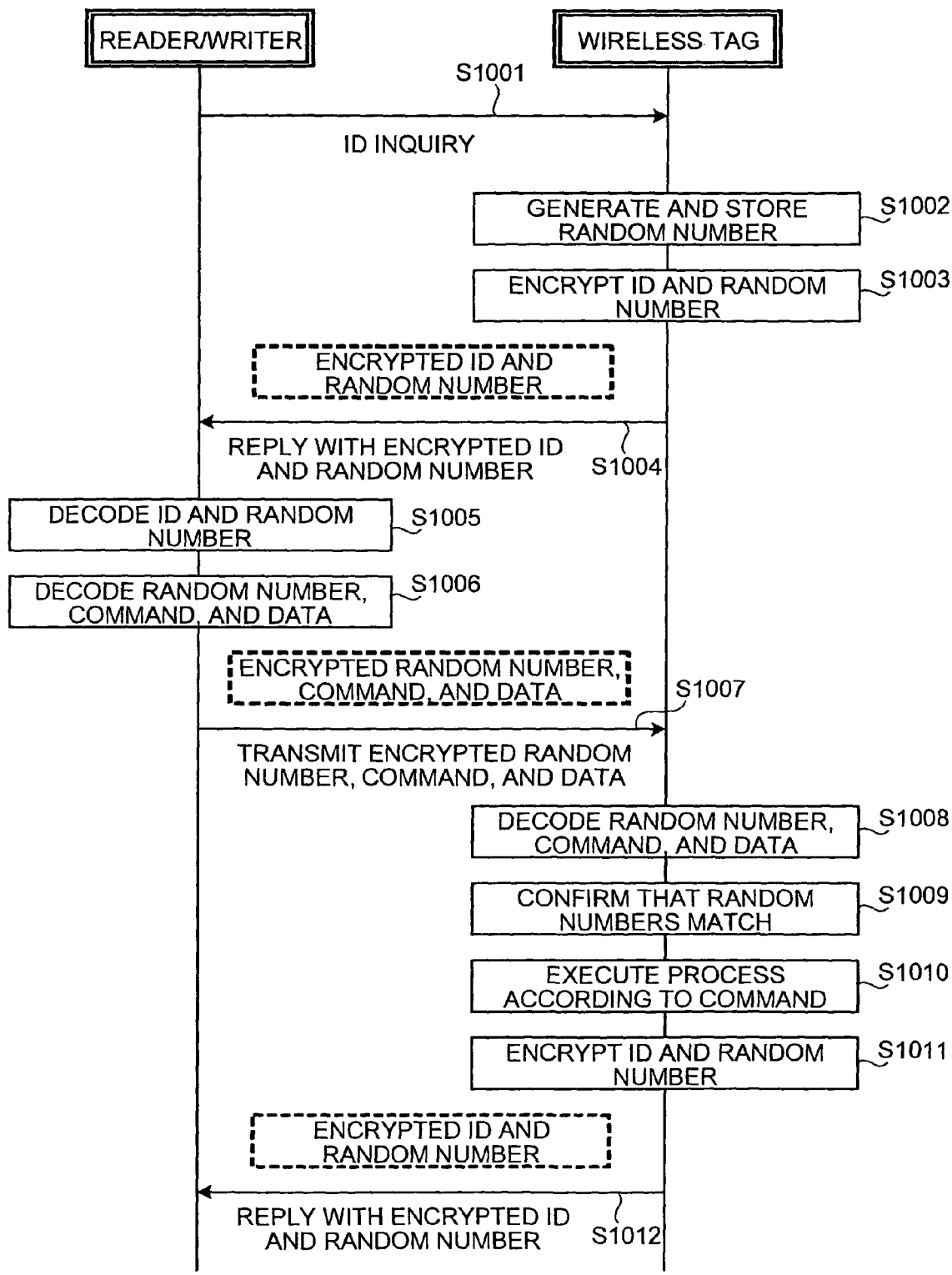
FIG. 28 is a sequence diagram of an exchange between the wireless tag and the reader/writer shown in FIG. 27.

Processing procedures performed by the wireless tag 1000*j* and the reader/writer will be explained next. FIG. 28 is a sequence diagram of a processing procedure performed by the wireless tag 1000*j* and the reader/writer shown in FIG. 27. In the procedure of FIG. 28, the reader/writer sends an ID inquiry to the wireless tag 1000*j*, requests execution of a command after identifying the ID, and confirms that execution is completed.

When the reader/writer sends an ID inquiry to the wireless tag 1000*j* (step S1001), the wireless tag 1000*j* generates a random number in the encrypted ID generating mechanism 1500 and stores it in the random number holder 1370 (step S1002). It then encrypts the ID and the random number (step S1003) and transmits these values in reply to the reader/writer (step S1004).

The reader/writer decodes the encrypted ID and the encrypted random number, and identifies the ID (step S1005). The reader/writer then encrypts data and a command that it will request the wireless tag 1000*j* to execute, together with the decoded random number (step S1006), and transmits them to the wireless tag 1000*j* (step S1007).

The wireless tag 1000*j* decodes the random number, the command, and the data (step S1008). If it confirms that the random number matches the value held in the random number holder 1370 (step S1009), it uses the data to executes a process according to the command (step S1010). To notify that execution has been completed, the wireless tag 1000*j* encrypts the ID and the random number (step S1011) and transmits these values in a reply to the reader/writer (step S1012).

The reader/writer decodes the encrypted ID and the encrypted random number, and confirms, based on the reply from the tag that transmitted the command, which the command is executed.

Figure 29:
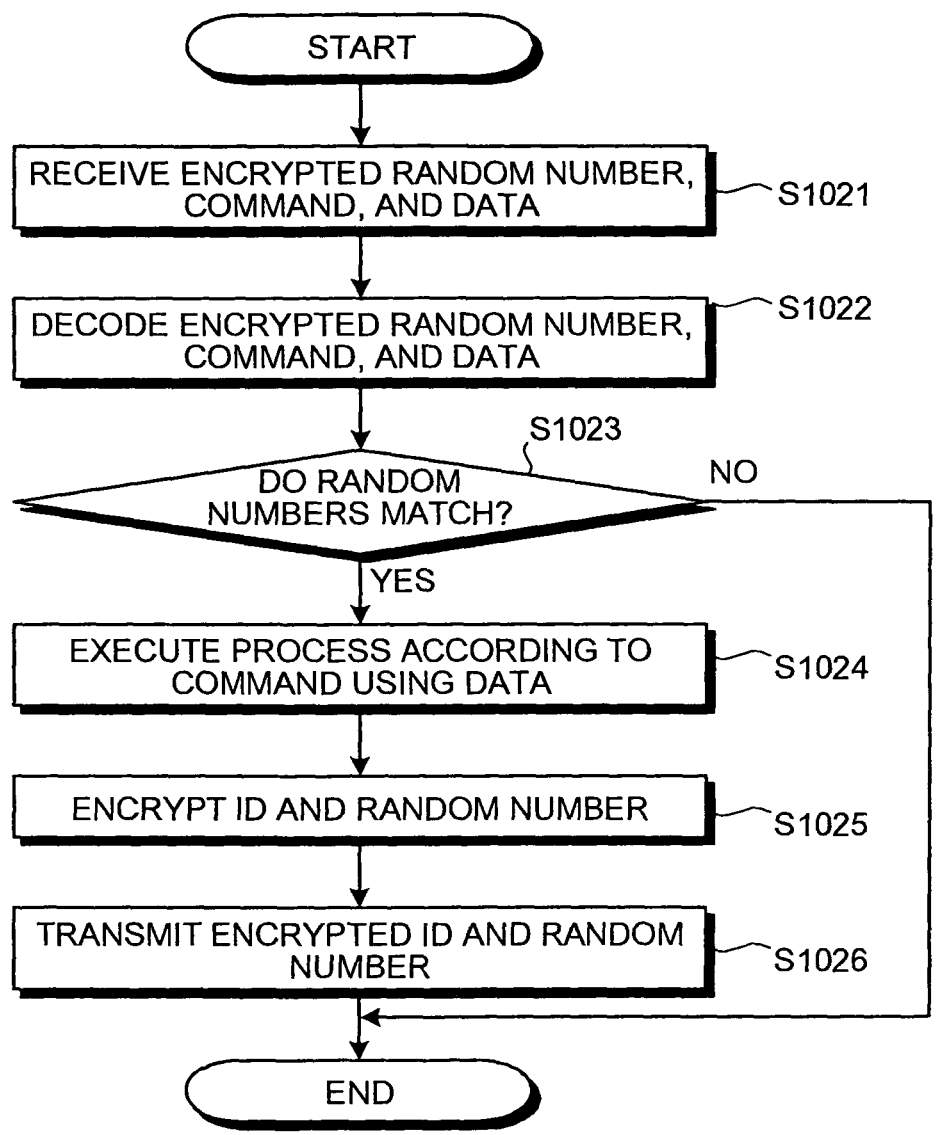
FIG. 29 is a flowchart of a processing procedure performed by the wireless tag shown in FIG. 27.

A processing procedure performed by the wireless tag 1000*j* will be explained next. FIG. 29 is a flowchart of a processing procedure performed by the wireless tag 1000*i* shown in FIG. 27. In the procedure of FIG. 29, the wireless tag 1000*j* receives a command from the reader/writer.

When the wireless tag 1000*j* receives the encrypted random number, the command, and the data (step S1021), it decodes them (step S1022) and confirms whether the decoded random number matches the value held in the random number holder 1370.

If the values match (step S1023: Yes), the wireless tag 1000*j* uses the data to execute a process according to the command (step S1024). To notify that execution is completed, it encrypts the ID and the random number (step S1025) and transmits these values in reply to the reader/writer (step S1026). If the values do not match (step S1023: No), the wireless tag 1000*j* ends the process without replying.

As described above in the tenth embodiment, when specifying a wireless tag, instead of using the ID the reader/writer uses the random number generated to give confidential variability to the ID. This prevents the ID from being leaked due to interception of transmission data of the reader/writer.

The above embodiments describe methods that give confidential variability to the ID of a wireless tag in an exchange between the wireless tag and a reader/writer. However, since the ID of the wireless tag is held in an unencrypted state in the reader/writer, there is a possibility that the ID can be leaked through an illegitimate access of the reader/writer. An eleventh embodiment of the present invention describes a method that does not give the original ID of the wireless tag to the reader/writer.

Figure 30:
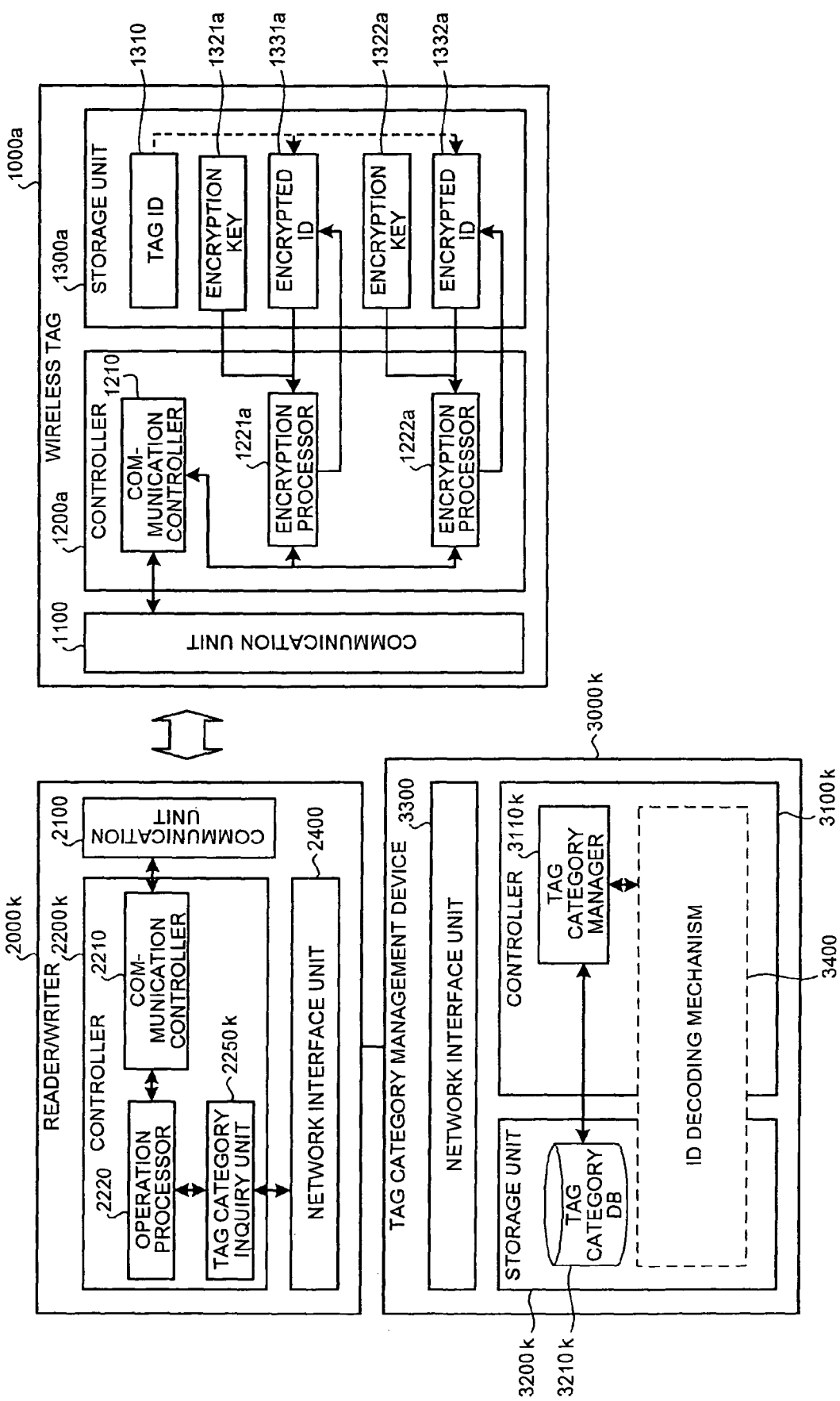
FIG. 30 is a functional block diagram of the configurations of a wireless tag, a reader/writer, and a tag category management device according to an eleventh embodiment of the present invention.

Firstly, the configurations of a wireless tag, a reader/writer, and a tag category management device according to the eleventh embodiment will be explained. FIG. 30 is a functional block diagram of configurations of the wireless tag, the reader/writer, and the tag category management device according to the eleventh embodiment.

In FIG. 30, the wireless tag 1000*a* and a reader/writer 2000*k* exchange information via wireless communications, and the reader/writer 2000*k* is connected via a network or the like to a tag category management device 3000*k*. A plurality of reader/writers can be connected to this tag category management device 3000*k*.

The wireless tag 1000*a* is the same as the one shown in FIG. 1. Provided that the wireless tag is compatible with ID decoding performed by an ID decoding mechanism 3400 of the tag category management device 3000*k*, any type of wireless tag can be used.

The reader/writer 2000*k* performs predetermined processes by receiving information such as IDs from wireless tags such as the wireless tag 1000*a* via wireless communications, transmitting information to wireless tags such as the wireless tag 1000*a* and writing it when required. The reader/writer 2000*k* includes the communication unit 2100, a controller 2200*k*, and a network interface unit 2400.

The controller 2200 controls operations of the reader/writer 2000*k*, and includes the communication controller 2210, the operation processor 2200, and a tag category inquiry unit 2250*k*. The tag category inquiry unit 2250*k* is a processor that obtains various types of category information that correspond to encrypted IDs obtained from wireless tags such as the wireless tag 1000*a* by sending inquiries to the tag category management device 3000*k*.

The network interface unit 2400 exchanges various types of information with the tag category management device 3000*k*.

The tag category management device 3000*k* stores various types of category information and responds to inquiries from reader/writers such as the reader/writer 2000*k*. The tag category management device 3000*k* includes a controller 3100*k*, a storage unit 3200*k*, a network interface unit 3300, and the ID decoding mechanism 3400.

The controller 3100 controls operations of the tag category management device 3000k, and includes a tag category manager 3110k. The tag category manager 3110k is a processor that, when a category inquiry is received from a reader/writer such as the reader/writer 2000k, requests the ID decoding mechanism 3400 to decode the encrypted ID, uses the encrypted ID as a key to search a tag category database (DB) 3210k of the storage unit 3200k, obtains category information relating to the inquiry, and transmits it in reply.

The storage unit 3200k stores various types of information, and includes the tag category DB 3210k. The tag category DB 3210k stores each type of category information relating to IDs of wireless tags. For example, for the ID of a wireless tag that is incorporated in an electrical product, the tag category DB 3210k stores information such as the maker, date of manufacture, model number, and price.

The network interface unit 3300 exchanges various types of information with a reader/writer such as the reader/writer 2000k. The ID decoding mechanism 3400 decodes an encrypted ID by using one of the decoding methods described in the above embodiments or another decoding method.

Figure 31:
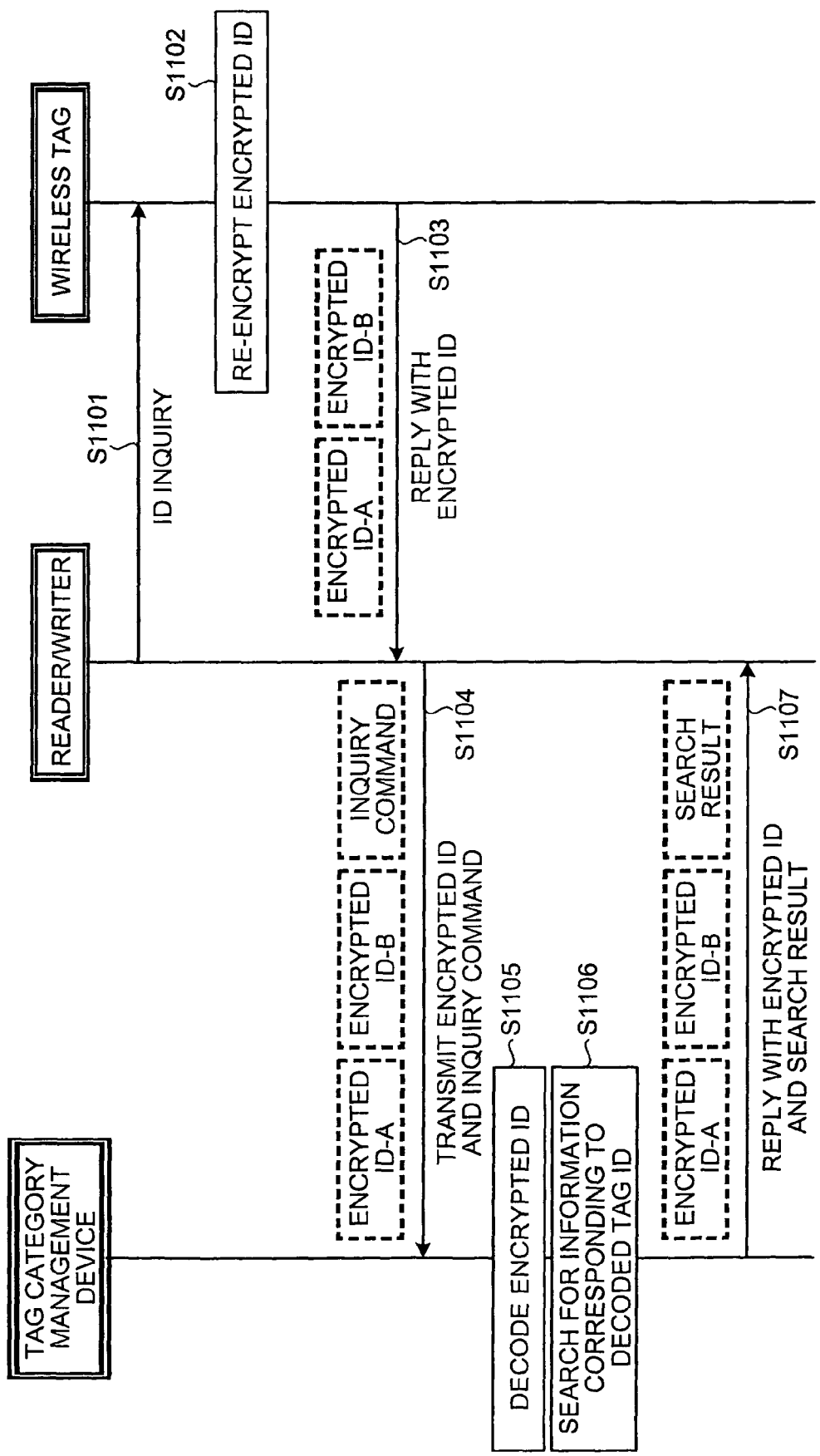
FIG. 31 is a sequence diagram of an exchange performed by the wireless tag, the reader/writer, and the tag category management device shown in FIG. 30.

A procedure for exchanging information performed by the wireless tag 1000a, the reader/writer 2000k, and the tag category management device 3000k will be explained next. FIG. 31 is a sequence diagram of a procedure for exchanging information performed by the wireless tag 1000a, the reader/writer 2000k, and the tag category management device 3000k shown in FIG. 30. In the procedure of FIG. 31, the reader/writer 2000k transmits an ID inquiry to the wireless tag 1000a and obtains category information corresponding to that ID.

When the reader/writer 2000k sends an ID inquiry to the wireless tag 1000a (step S1101), the wireless tag 1000a re-encrypts the ID (step S1102) and transmits it in reply to the reader/writer 2000k (step S1103).

When the reader/writer 2000k receives the reply, it transmits the encrypted ID and an inquiry command to the tag category management device 3000k to obtain category information (step S1104).

When the tag category management device 3000k receives the inquiry, it decodes the ID included therein (step S1105) and uses the decoded original ID as a key to search the tag category DB 3210k and obtain information that corresponds to the content of the inquiry command (step S1106). It then transmits the decoded ID together with the result of the search to the reader/writer 2000k.

In the eleventh embodiment, the encrypted ID is decoded by the tag category management device 3000k that manages information relating to wireless tag IDs, and information relating to the decoded ID is transmitted in a reply to the reader/writer. Therefore, various types of processes can be performed without decoding the ID of the wireless tag, preventing the ID from being leaked via illegitimate access of the reader/writer.

Since the tag category management device 3000k does not exchange communications directly with the wireless tags, it can be installed in a securely guarded location, and the number of installed devices can be limited by using one for a plurality of reader/writers. This makes it comparatively easy to maintain security and reduces the risk of receiving illegitimate accesses.

As described in the above embodiments, the problem of tracking can be solved by giving confidential variability to the ID in a reply from the wireless tag. However, illegitimate use of a service by spoofing cannot be prevented merely by giving confidential variability to the IDs.

The ID sent in reply from the wireless tag described in the above embodiments includes an encrypted ID and data for decoding the ID. If the ID in the reply from the wireless tag is intercepted and stored, and the same value is used in a reply to the reader/writer, the encrypted ID can be decoded normally and spoofed as a legitimate wireless tag. A twelfth embodiment of the present invention describes a method for preventing such spoofing.

Figure 32:
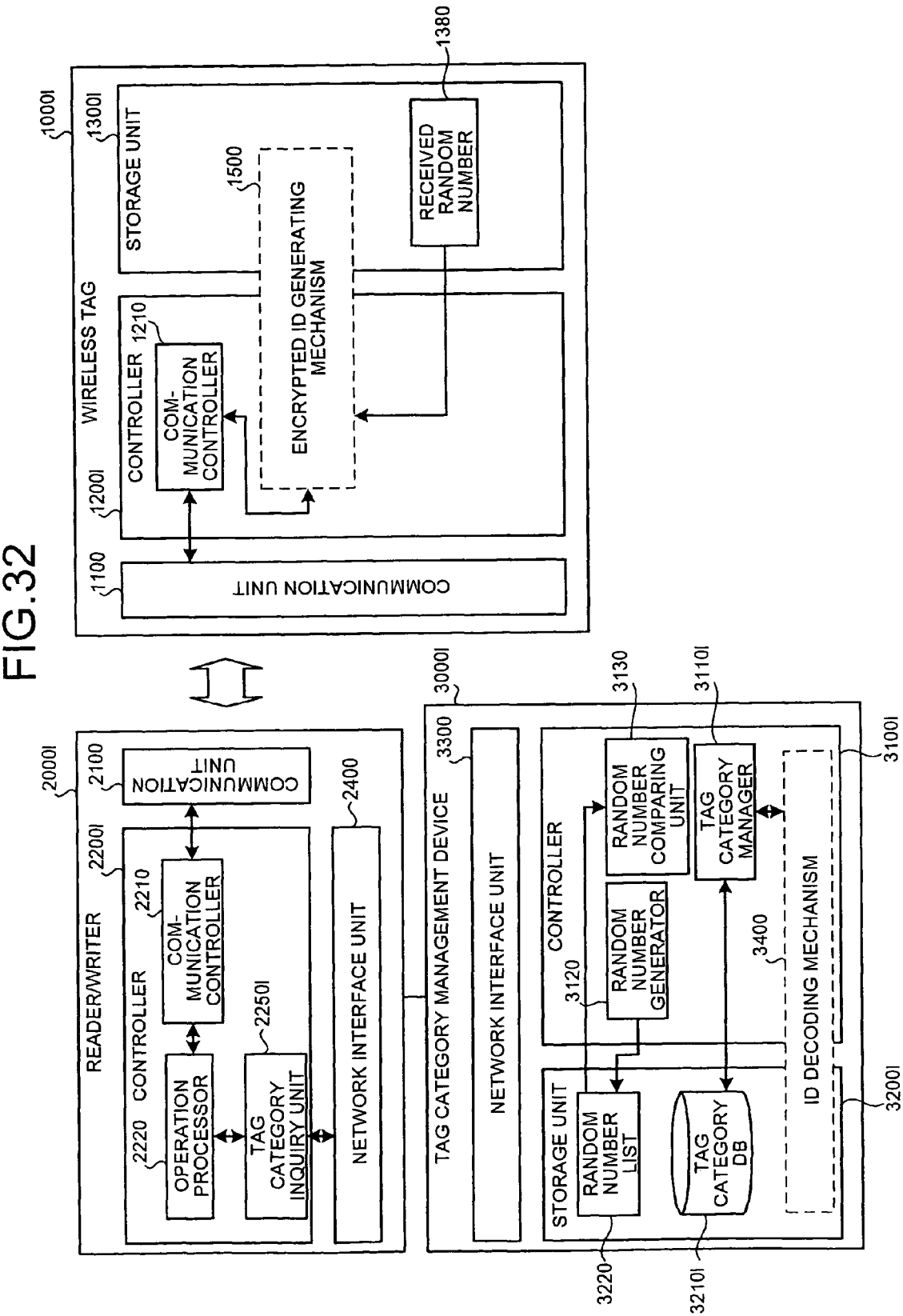
FIG. 32 is a functional block diagram of the configurations of a wireless tag, a reader/writer, and a tag category management device according to a twelfth embodiment of the present invention.

Firstly, the configurations of a wireless tag, a reader/writer, and a tag category management device according to the twelfth embodiment will be explained. FIG. 32 is a functional block diagram of the configurations of the wireless tag, the reader/writer, and the tag category management device according to the twelfth embodiment.

In FIG. 32, a wireless tag 1000l and a reader/writer 2000l exchange information via wireless communications, and the reader/writer 2000l is connected via a network or the like to a tag category management device 3000l. A plurality of reader/writers can be connected to this tag category management device 3000l.

The wireless tag 1000l is a device that exchanges IDs and the like with reader/writers such as the reader/writer 2000l via wireless communications, and includes the communication unit 1100, a controller 1200l, a storage unit 1300l, and the encrypted ID generating mechanism 1500.

The controller 1200l controls operations of the wireless tag 1000l and includes the communication controller 1210.

The storage unit 1300l stores various types of information, and includes a received random number 1380. The received random number 1380 is generated by the tag category management device 3000l and transmitted from the reader/writer 2000l to the wireless tag 1000l at the time of an ID inquiry. The encrypted ID generating mechanism 1500 uses this received random number 1380 to encrypt the original ID.

The reader/writer 2000l is a device that performs predetermined processes by receiving information such as IDs from wireless tags such as the wireless tag 1000l via wireless communications, transmitting the information to wireless tags such as the wireless tag 1000l and writing it when required. The reader/writer 2000l includes the communication unit 2100, a controller 2200l, and the network interface unit 2400.

The controller 2200l controls operations of the reader/writer 2000l, and includes the communication controller 2210, the operation processor 2200, and the tag category inquiry unit 2250l. The tag category inquiry unit 2250l is a processor that obtains various types of category information corresponding to encrypted IDs obtained from wireless tags such as the wireless tag 1000l by sending inquiries to the tag category management device 3000l. The tag category inquiry unit 2250l also requests the tag category management device 3000l to generate a random number when an ID inquiry is made to the wireless tag 1000l or the like.

The tag category management device 3000l stores various types of category information and responds to inquiries from reader/writers such as the reader/writer 2000l. The tag category management device 3000l includes a controller 3100l, a storage unit 3200l, a network interface unit 3300, and the ID decoding mechanism 3400.

The controller 3100l controls operations of the tag category management device 3000l, and includes a tag category manager 3110l, a random number generator 3120, and a random number comparing unit 3130. The tag category manager 3110l is a processor that, when a category inquiry is received from a reader/writer such as the reader/writer 2000l, requests the ID decoding mechanism 3400 to decode the encrypted ID, uses the encrypted ID as a key to search a tag category DB 3210l of the storage unit 3200l, obtains category information relating to the inquiry, and transmits it in reply.

The random number generator 3120 is a processor that generates a random number in reply to a request from a reader/writer such as the reader/writer 2000*l*. The generated random number is transmitted in reply to the reader/writer that is the request source, and is transmitted from the reader/writer together with an ID inquiry to the wireless tag. The random number is stored together with information that identifies the reader/writer and a connection session in a random number list 3220 of the storage unit 3200*l*.

The random number comparing unit 3130 is a processor that, when a category inquiry is received from a reader/writer such as the reader/writer 2000*l*, determines whether the random number included in the inquiry is legitimate by referring to the random number list 3220. More specifically, it determines that the random number included in the inquiry is illegitimate if it is not in the random number list 3220. The random number is also deemed illegitimate if it is listed in correspondence with a different session.

When the random number comparing unit 3130 determines that the random number is illegitimate, the tag category manager 3110*l* replies to the reader/writer that the wireless tag is illegitimate. On receiving this reply, the reader/writer invalidates exchanges of information with that wireless tag.

The storage unit 3200*l* stores various types of information, and includes the tag category DB 3210*l* and the random number list 3220. The tag category DB 3210*l* stores various types of category information in correspondence with IDs of wireless tags. The random number list 3220 stores random numbers generated by the random number generator 3120 in correspondence with information that identifies the session of the reader/writer that is the request source of each random number.

Figure 33:
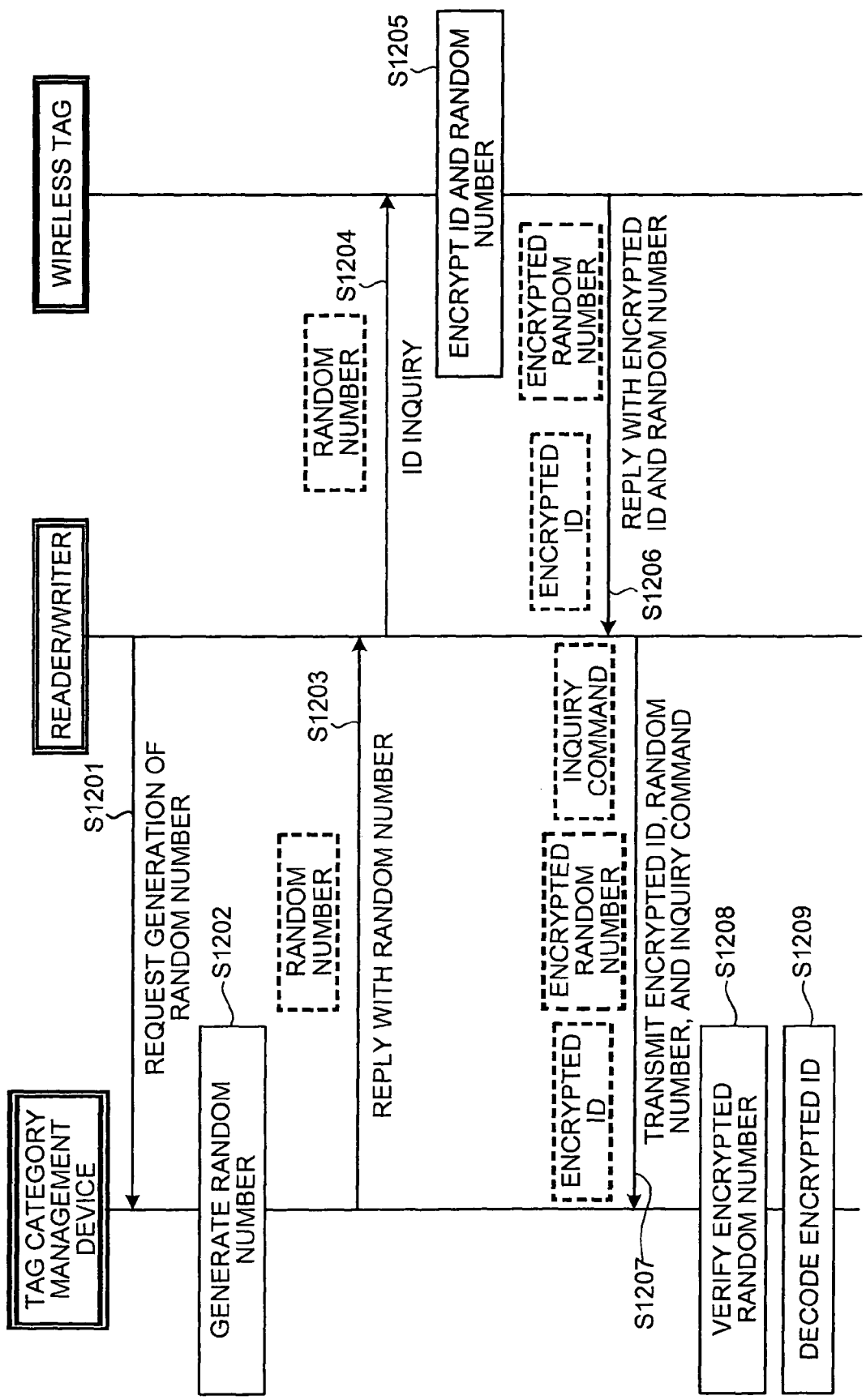
FIG. 33 is a sequence diagram of an exchange performed by the wireless tag, the reader/writer, and the tag category management device shown in FIG. 32.

A procedure for exchanging information performed by the wireless tag 1000*l*, the reader/writer 2000*l*, and the tag category management device 3000*l* will be explained next. FIG. 33 is a sequence diagram of a procedure for exchanging information performed by the wireless tag 1000*l*, the reader/writer 2000*l*, and the tag category management device 3000*l* shown in FIG. 32. In the procedure of FIG. 33, the reader/writer 2000*l* submits an ID inquiry to the wireless tag 1000*l* and requests category information corresponding to that ID.

When the reader/writer 2000*l* needs to make an ID inquiry to the wireless tag 1000*l*, it requests the tag category management device 3000*l* to generate a random number (step S1201). The tag category management device 3000*l* generates a random number, stores it internally together with session information (step S1202), and transmit it as a reply to the reader/writer 2000*l* (step S1203).

When the reader/writer 2000*l* receives the random number, it transmits this random number together with an ID inquiry to the wireless tag 1000*l* (step S1204).

When the wireless tag 1000*l* receives the ID inquiry, it uses the random number transmitted with the ID inquiry to encrypt the ID, and also encrypts the random number itself (step S1205). The wireless tag 1000*l* transmits the encrypted ID and the encrypted random number in a reply to the reader/writer 2000*l* (step S1206).

When the reader/writer 2000*l* receives this reply, it transmits the encrypted ID, the encrypted random number, and an inquiry command to the tag category management device 3000*l* to obtain the category information (step S1207).

When the tag category management device 3000*l* receives the inquiry, it decodes the random number included in the inquiry and checks the random number list 3220 (step S1208). If it confirms that this random number is created during the current session, it decodes the encrypted ID, uses the decoded original ID to search the tag category DB 3210*l*, obtains the information that corresponds to the content of the inquiry command, and transmits the encrypted ID together with the result of the search to the reader/writer 2000*l* (step S1209).

Thus, in the twelfth embodiment, random numbers used by the wireless tags when encrypting IDs are generated and stored by the tag category management device 3000*l*, and, when the tag category management device 3000*l* receives an inquiry for category information, it confirms the legitimacy of the inquiry by comparing the random number included in the inquiry with the information it stores itself. This prevents illegitimate use by intercepting an encrypted ID and spoofing with it.

While the eleventh and the twelfth embodiments describe examples where category information relating of wireless tag IDs are collected and managed in a tag category management device, in the case of, for example, personal information, it is necessary to define the extent to which this information can be disclosed by the reader/writers that are connected to the tag category management device. When such information is managed in reader/writer units, the number of management operations increases in proportion to the number of reader/writers that are connected to the tag category management device. A thirteenth embodiment of the present invention describes a method for managing reader/writers that are connected to a tag category management device in group units, and controlling the disclosure of information in group units.

Figure 34:
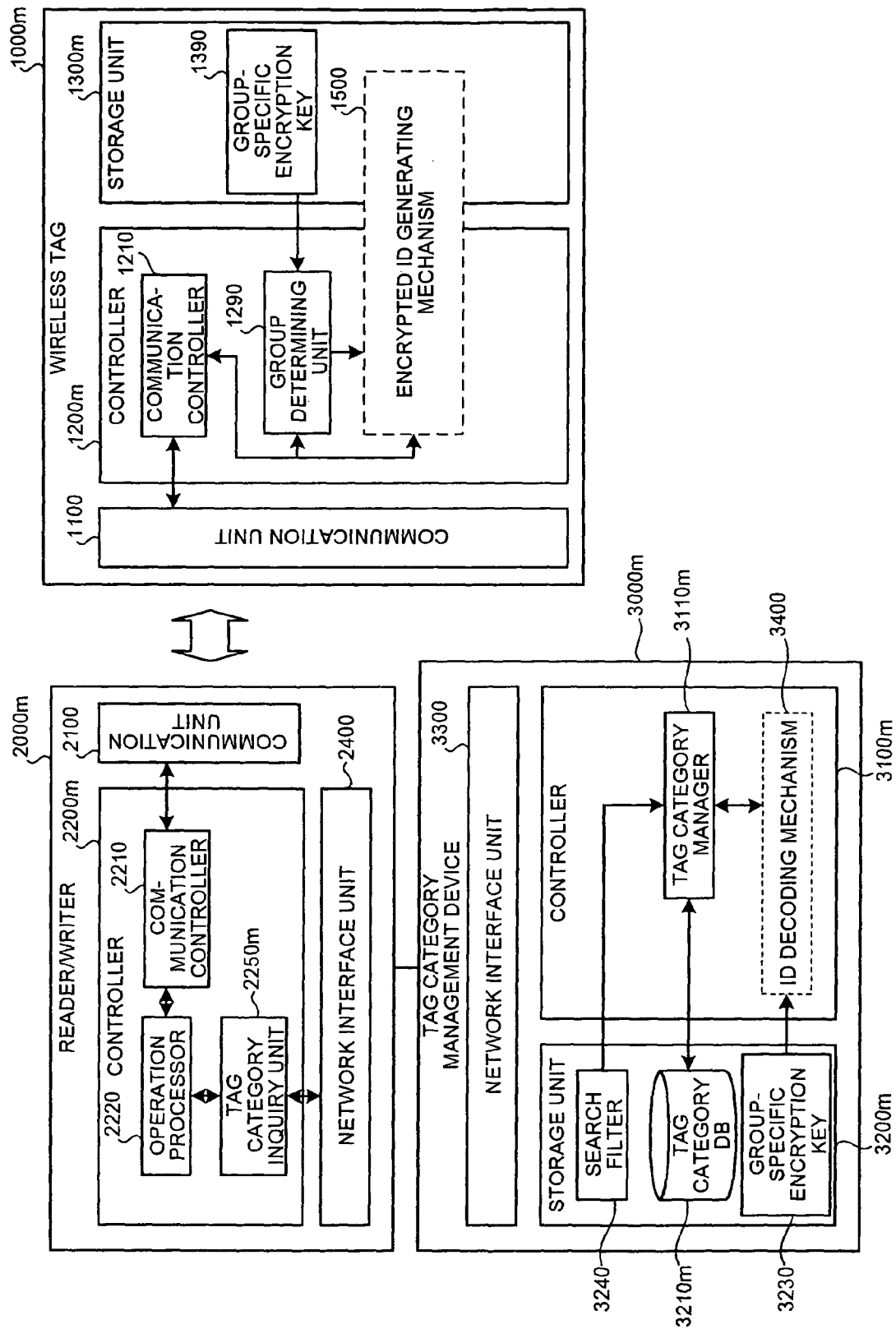
FIG. 34 is a functional block diagram of the configurations of a wireless tag, a reader/writer, and a tag category management device according to a thirteenth embodiment of the present invention.

Firstly, the configurations of a wireless tag, a reader/writer, and a tag category management device according to the thirteenth embodiment will be explained. FIG. 34 is a functional block diagram of the configurations of the wireless tag, the reader/writer, and the tag category management device according to the thirteenth embodiment.

In FIG. 34, a wireless tag 1000*m* and a reader/writer 2000*m* exchange information via wireless communications, and the reader/writer 2000*m* is connected via a network or the like to a tag category management device 3000*m*.

Although not shown in FIG. 34, a plurality of reader/writers are connected to the tag category management device 3000*m*, and are managed by division into several groups. The wireless tag 1000*m* can be used by reader/writers of a predetermined group, but not by reader/writers of other groups.

The wireless tag 1000*m* exchanges information such as IDs with reader/writers such as the reader/writer 2000*m* via wireless communications, and includes the communication unit 1100, a controller 1200*m*, a storage unit 1300*m*, and the encrypted ID generating mechanism 1500.

The controller 1200*m* controls operations of the wireless tag 1000*m*, and includes the communication controller 1210 and a group determining unit 1290.

The group determining unit 1290 is a processor that, when an ID inquiry is received from a reader/writer such as the reader/writer 2000*m*, obtains a group ID that is received with the inquiry, refers to a group-specific encryption key 1390 of the storage unit 1300*m*, and obtains an encryption key that corresponds to the group ID.

The group-specific encryption key 1390 stores at least one combination of an ID of a group of reader/writers that can use the wireless tag 1000*m* and an encryption key for that group. A different encryption key is used for each group so that, if a key is leaked, it will not affect other groups.

When the group determining unit 1290 refers to the group-specific encryption key 1390 and obtains the encryption key that corresponds to the group ID, it sends the encryption key to the encrypted ID generating mechanism 1500, where the ID is encrypted with that encryption key. When the group determining unit 1290 refers to the group-specific encryption key 1390 and there is no group ID for that group, it suppresses a reply to the ID inquiry.

The storage unit 1300$h$ stores various types of information, and includes the group-specific encryption key 1390. The group-specific encryption key 1390 has already been explained, and will not be explained further.

The reader/writer 2000$m$ is a device that performs predetermined processes by receiving information such as IDs from wireless tags such as the wireless tag 1000$m$ via wireless communications, transmitting the information to wireless tags such as the wireless tag 1000$m$ and writing it when required. The reader/writer 2000$m$ includes the communication unit 2100, a controller 2200$m$, and the network interface unit 2400.

When the reader/writer 2000$m$ belongs to specific reader/writer group, and, when transmitting an ID inquiry to a wireless tag such as the wireless tag 1000$m$, transmits it together with an inquiry relating to the ID of the group that it belongs to. When transmitting a category inquiry that relates to the wireless tag ID to the tag category management device 3000$m$, the reader/writer 2000$m$ also transmits its group ID.

The controller 2200, controls operations of the reader/writer 2000$m$, and includes the communication controller 2210, the operation processor 2220, and a tag category inquiry unit 2250$m$. The tag category inquiry unit 2250$m$ is a processor that obtains various types of category information, which corresponds to encrypted IDs obtained from wireless tags such as the wireless tag 1000$m$, by transmitting an inquiry to the tag category management device 3000$m$.

The tag category management device 3000$m$ holds various types of information corresponding to wireless tags IDs, and replies to inquiries from reader/writers such as the reader/writer 2000$m$. The tag category management device 3000$m$ includes a controller 3100$m$, a storage unit 3200$m$, the network interface unit 3300, and the ID decoding mechanism 3400.

The controller 3100$m$ controls operations of the tag category management device 3000$m$, and includes a tag category manager 3110$m$. The tag category manager 3110$m$ is a processor that, when a category inquiry is received from a reader/writer such as the reader/writer 2000$m$, requests the ID decoding mechanism 3400 to decode the encrypted ID, searches a tag category DB 3210$m$ by using the encrypted ID as a key, obtains the category information that relates to the inquiry, and transmits it in reply.

When requesting the ID decoding mechanism 3400 to decode the encrypted ID, the tag category manager 3110$m$ refers to a group-specific encryption key 3230 of the storage unit 3200$m$, obtains the encryption key that corresponds to the group ID included in the inquiry, and uses this encryption key to decode the ID.

When searching the tag category DB 3210$m$, the tag category manager 3110$m$ refers to a search filter 3240 of the storage unit 3200$m$ and searches only information that is allowed to be searched with respect to the group ID included in the inquiry.

The storage unit 3200$m$ stores various types of information, and includes the tag category DB 3210$m$, the group-specific encryption key 3230, and the search filter 3240. The tag category DB 3210$m$ stores various types of category information that relate to wireless tag IDs. The group-specific encryption key 3230 stores combinations of groups that reader/writers connected to the tag category management device 3000$m$ belong to and encryption keys used by those groups. The search filter 3240 indicates which information each group is allowed to search for.

Figure 35:
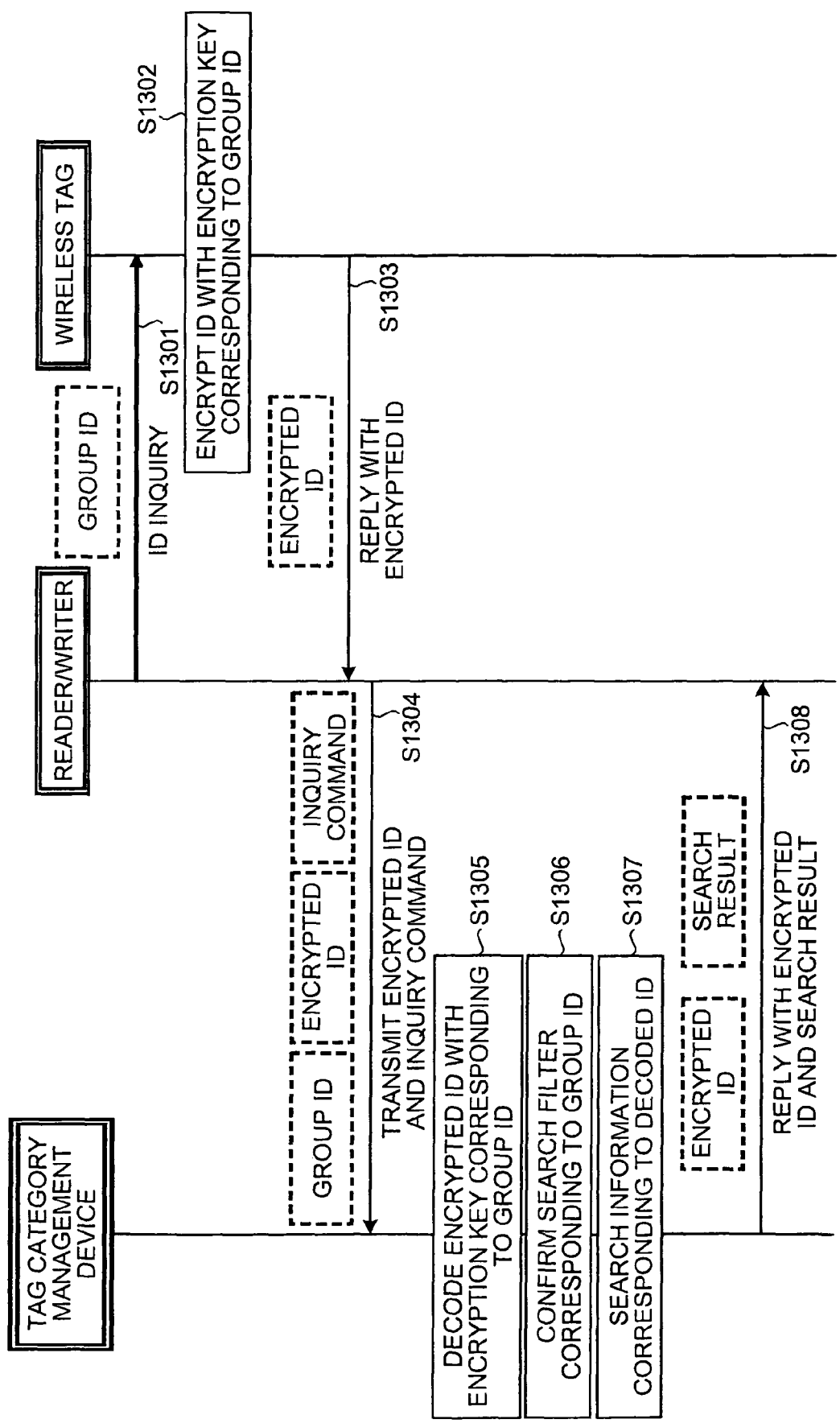
FIG. 35 is a sequence diagram of an exchange performed by the wireless tag, the reader/writer, and the tag category management device shown in FIG. 34.

A procedure for exchanging information performed by the wireless tag 1000$m$, the reader/writer 2000$m$, and the tag category management device 3000$m$ will be explained next. FIG. 35 is a sequence diagram of a procedure for exchanging information performed by the wireless tag 1000$m$, the reader/writer 2000$m$, and the tag category management device 3000$m$ shown in FIG. 34. In the procedure of FIG. 35, the reader/writer 2000$m$ transmits an ID inquiry to the wireless tag 1000$m$ and receives category information corresponding to that ID.

The reader/writer 2000$m$ transmits an ID inquiry, together with the group ID of the group that it belongs to, to the wireless tag 1000$m$ (step S1301). When the wireless tag 1000$m$ receives the ID inquiry, it uses an encryption key corresponding to the group ID transmitted together with the inquiry to encrypt the ID (step S1302), and transmits the encrypted ID in a reply to the reader/writer 2000$m$ (step S1303).

When the reader/writer 2000$m$ receives this reply, it transmits the group ID, the encrypted ID, and an inquiry command to the tag category management device 3000$m$ (step S1304).

When the tag category management device 3000$m$ receives the inquiry, it uses the encryption key that corresponds to the group ID included in the inquiry to decode the ID (step S1305), confirms which information the group corresponding to the group ID is permitted to search by referring to the search filter 3240 (step S1306), uses the decoded original ID as a key to search the tag category DB 3210$m$ and obtain the information that is search-permissible from among the information that corresponds to the content of the inquiry command (step S1307), and transmits the encrypted ID together with the result of the search in a reply to the reader/writer 2000$m$ (step S1308).

Thus, in the thirteenth embodiment, permission/non-permission to refer to information is set in units of reader/writer groups in the search filter 3240, and only information that is search-permissible according to the search filter 3240 is transmitted in replies to the reader/writers. This enables the disclosure of information to be controlled by a few management operations.

The processes performed by the controllers of the reader/writers and the tag category management devices in the above embodiments can be realized by making a processor execute predetermined programs that are loaded in a memory. These programs can be stored in the storage unit of the device, and also in information processing devices such as other server devices, and executed by downloading them when required.

The methods of the embodiments described above can be combined as appropriate, and can be implemented with some parts omitted.

According to the present invention, first encoded data, which is encoded such that a value of an ID changes each time, and second encoded data for decoding the first encoded data are transmitted as an ID from a wireless tag, and the reader/writer can decode the original ID by using these two encoded data. Therefore, the load of the decoding process does not increase as the number of wireless tags whose IDs require decoding increase, and it becomes possible to give confidential variability to the IDs transmitted by the wireless tags while reducing the load of the decoding process.

According to the present invention, since an encryption process is used to encode the ID, the size of the circuit can be made smaller than the size when a hash process is used in the encoding.

According to the present invention, ID inquiries are not replied to for a predetermined period of time after replying to an ID inquiry. This prevents the IDs from being leaked by continuously obtaining a great number of IDs.

According to the present invention, the set content of a flag controls whether to reply by transmitting a unique ID or an ID with confidential variability. Therefore, IDs having confidential variability can also be transmitted in an environment where the reader/writers and the like are not compatible with wireless tags that transmit such IDs having confidential variability.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless tag that includes a unique ID, comprising:
   a first encoded data generator that generates first encoded data of different values based on the unique ID for each time of receiving an ID inquiry;
   a second encoded data generator that generates second encoded data used for decoding the first encoded data, the second encoded data having a different value corresponding to the first encoded data of different values;
   a communication unit that replies to the ID inquiry for each time of receiving by transmitting a combination of the first encoded data and the second encoded data; and
   a flag that, in reply to each ID inquiry, is set whether to reply with the unique ID or with a combination of the first encoded data and the second encoded data, wherein
   when the flag is set to reply with the unique ID, the communication unit replies to each ID inquiry by transmitting the unique ID instead of a combination of the first encoded data and the second encoded data.

2. A wireless tag that includes a unique ID, comprising:
   a first encoded data generator that generates first encoded data of different values based on the unique ID for each time of receiving an ID inquiry;
   a second encoded data generator that generates second encoded data used for decoding the first encoded data, the second encoded data having a different value corresponding to the first encoded data of different values; and
   a communication unit that replies to the ID inquiry for each time of receiving by transmitting a combination of the first encoded data and the second encoded data, wherein
   the first encoded data generator generates the first encoded data by using a first key to encrypt the unique ID for a predetermined number of encryptions; and
   the second encoded data generator generates the second encoded data by using a second key to encrypt the unique ID for the same number of encryptions as the first encoded data generator.

3. The wireless tag according to claim 1, wherein
   the first encoded data generator generates the first encoded data by encrypting the unique ID for a predetermined number of encryptions; and
   the second encoded data generator generates the second encoded data by encrypting an ID that is common to other wireless tags for the same number of encryptions as the first encoded data generator.

4. The wireless tag according to claim 1, wherein
   the first encoded data generator generates the first encoded data by encrypting the unique ID for a predetermined number of encryptions; and
   the second encoded data generator generates the second encoded data by encrypting the number of encryptions of the unique ID encrypted by the first encoded data generator.

5. The wireless tag according to claim 1, further comprising
   a random number generator that generates a new random number each time each ID inquiry is received, wherein
   the first encoded data generator generates the first encoded data based on both an encryption of a result of an exclusive-OR operation on the unique ID and generated random number; and
   the second encoded data generator generates the second encoded data by encrypting the generated random number.

6. The wireless tag according to claim 1, further comprising a reply control unit that controls the communication unit such that, after replying to each ID inquiry, the communication unit does not reply to ID inquiries for a predetermined period of time.

7. The wireless tag according to claim 1, further comprising a reply control unit that controls the communication unit such that, after replying to each ID inquiry, the communication unit transmits the same reply to ID inquiries for a predetermined period of time.

8. The wireless tag according to claim 1, further comprising:
   an encoded data storage unit that stores the first encoded data and the second encoded data, the encoded data storage unit being referred to when a request for a specific bit is received from an anticollision function, to identify the status of the bit;
   a position storage unit that stores information indicative of a position of a bit that is last requested by an anticollision function; and
   a determining unit that, when an anticollision function newly requests a bit, determines whether the request is illegitimate by comparing a position of the newly requested bit with the position of a bit stored in the position storage unit, and, when the request is determined to be illegitimate, regenerates encoded data of the encoded data storage unit.

9. An encoding system that authenticates a unique ID of a wireless tag that is sent from a reader/writer, comprising:
   a first decoding unit that decodes first encoded data included in a reply to each ID inquiry for a wireless tag that is sent from the reader/writer to obtain first decoded data;
   a second decoding unit that decodes second encoded data, corresponding to the first encoded data of a different value, included in the reply to obtain second decoded data used for decoding the first encoded data of the different value;
   an identifying unit that identifies the unique ID based on the first decoded data and the second decoded data; and
   a flag that, in reply to each ID inquiry, is set whether to reply with the unique ID or with a combination of the first encoded data and the second encoded data, wherein
   when the flag is set to reply with the unique ID, each ID inquiry is replied to by transmitting the unique ID instead of a combination of the first encoded data and the second encoded data.

10. A reader/writer that authenticates a unique ID of a wireless tag, the reader/writer comprising:
    a first decoding unit that decodes first encoded data that is included in a reply to each ID inquiry to a wireless tag to obtain first decoded data;

a second decoding unit that decodes second encoded data, corresponding to the first encoded data of a different value, included in the reply to obtain second decoded data used for decoding the first encoded data of the different value;

an identifying unit that identifies the unique ID based on the first decoded data and the second decoded data; and a flag that, in reply to each ID inquiry, is set whether to reply with the unique ID or with a combination of the first encoded data and the second encoded data, wherein when the flag is set to reply with the unique ID, each ID inquiry is replied to by transmitting the unique ID instead of a combination of the first encoded data and the second encoded data.

11. An encoding method used when a wireless tag transmits a unique ID included in the wireless tag, comprising:

generating, by the wireless tag, first encoded data of different value based on the unique ID corresponding to a receiving of each ID inquiry;

generating, corresponding to the first encoded data of generated different value, by the wireless tag, second encoded data of different value used for decoding the first encoded data;

replying to the ID inquiry by transmitting, from the wireless tag, a combination of the first encoded data of different generated value and the second encoded data of different generated value;

in reply to each ID inquiry, setting a flag whether to reply with the unique ID or with a combination of the first encoded data and the second encoded data; and when the flag is set to reply with the unique ID, replying to each ID inquiry by transmitting the unique ID instead of a combination of the first encoded data and the second encoded data.

12. An encoding method used when a wireless tag transmits a unique ID included in the wireless tag, comprising:

generating, by the wireless tag, first encoded data of different value based on the unique ID corresponding to a receiving of each ID inquiry;

generating, corresponding to the first encoded data of generated different value, by the wireless tag, second encoded data of different value used for decoding the first encoded data; and replying to the ID inquiry by transmitting, from the wireless tag, a combination of the first encoded data of different generated value and the second encoded data of different generated value, wherein the first encoded data is generated by using a first key to encrypt the unique ID for a predetermined number of encryptions; and the second encoded data is generated by using a second key to encrypt the unique ID for the same number of encryptions as the first encoded data generator.

13. The encoding method according to claim 11, wherein the first encoded data is generated by encrypting the unique ID for a predetermined number of encryptions; and the second encoded data is generated by encrypting an ID that is common to other wireless tags for the same number of encryptions as the first encoded data generator.

14. The encoding method according to claim 11, wherein the first encoded data is generated by encrypting the unique ID for a predetermined number of encryptions; and the second encoded data is generated by encrypting the number of encryptions of the unique ID encrypted by the first encoded data generator.

15. The encoding method according to claim 11, further comprising generating a new random number each time each ID inquiry is received, wherein the first encoded data is generated based on both an encryption of a result of an exclusive-OR operation on the unique ID and generated random number; and the second encoded data is generated by encrypting the generated random number.

16. The encoding method according to claim 11, further comprising controlling the replying such that, after replying to each ID inquiry, no reply is given to ID inquiries for a predetermined period of time.

17. The encoding method according to claim 11, further comprising controlling the replying such that, after replying to each ID inquiry, the same reply is transmitted to ID inquiries for a predetermined period of time.

* * * * *